US006487496B2

(12) United States Patent
Katayama et al.

(10) Patent No.: US 6,487,496 B2

(45) Date of Patent: Nov. 26, 2002

(54) MOBILE NAVIGATION APPARATUS WITH ROUTE DEVIATION INDICATION

(75) Inventors: Mutsumi Katayama; Hiroyuki Morita, both of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/819,733

(22) Filed: Mar. 29, 2001

(65) Prior Publication Data

US 2001/0029429 A1 Oct. 11, 2001

(30) Foreign Application Priority Data

Mar. 29, 2000 (JP) ....................................... 2000-091342

(51) Int. Cl.[7] ................................................ G01C 21/36

(52) U.S. Cl. ........................ 701/209; 701/210; 701/211; 701/212; 340/995

(58) Field of Search ................................ 701/209, 210, 701/211, 201, 212, 213; 340/995

(56) References Cited

U.S. PATENT DOCUMENTS 5,541,845 A * 7/1996 Klein ......................... 340/988
5,550,538 A * 8/1996 Fujii et al. .................. 340/990
5,911,775 A * 6/1999 Tanimoto ..................... 340/988
6,035,253 A * 3/2000 Hayashi et al. ............. 340/995

FOREIGN PATENT DOCUMENTS

| | | |
|---|---|---|
| JP | 532681 | 5/1993 |
| JP | 755481 A | 3/1995 |
| JP | 791971 A | 4/1995 |

* cited by examiner

*Primary Examiner*—Michael J. Zanelli
(74) *Attorney, Agent, or Firm*—Birch, Stewart, Kolasch & Birch, LLP

(57) ABSTRACT

To provide a mobile navigation apparatus for facilitating the decision as to which direction a vehicle should be headed when it has moved to a location deviated from a planned travel route. When the current location of a vehicle is at a location deviated from the planned travel route, a straight line connecting the current location to a shortest distance location on the planned travel route, the straight line making the distance shortest from the current location to the planned travel route is displayed on display means along with the map information stored in map information storage means and the vehicle's current positional information.

20 Claims, 24 Drawing Sheets

| ROUTE | SECTION DISTANCE | EXTRACTION WIDTH | NECESSARY STORAGE SPACE |
|---|---|---|---|
| $r_1$ | $L_1$ | $\Delta w_1$ | $L_1 \times \Delta w_1$ |
| $r_2$ | $L_2$ | $\Delta w_2$ | $L_2 \times \Delta w_2$ |
| ⋮ | ⋮ | ⋮ | ⋮ |
| $r_i$ | $L_i$ | $\Delta w_i$ | $L_i \times \Delta w_i$ |
| ⋮ | ⋮ | ⋮ | ⋮ |
| $r_{n-1}$ | $L_{n-1}$ | $\Delta w_{n-1}$ | $L_{n-1} \times \Delta w_{n-1}$ |

FIG. 13

MOBILE NAVIGATION APPARATUS WITH ROUTE DEVIATION INDICATION

BACKGROUND OF THE INVENTION

1. Field of the Invention

The present invention relates generally to a navigation system for use in mobile bodies which displays map information and current positional information.

2. Description of Background Art

Mobile navigation systems that display both map information and current positional information are disclosed in Japanese Patent Publication No. Hei 5-32681. The disclosed apparatus detects the travel distance and travel direction of a mobile body or a vehicle, obtains a mobile bodys current location from the detected travel distance and travel direction, and shows a straight line connecting the obtained current location to a destination onto map information on a display unit.

The background art mobile navigation apparatus displays a straight line connecting a current location to a destination and map information, so that if a mobile body deviates from a planned travel route, it is difficult to determine whether to travel along the planned route, go to the destination without returning to the planned route or go to another point on the planned route.

It is therefore an object of the present invention to provide an mobile navigation apparatus for facilitating the decision as to which direction the mobile body should head if the mobile body has deviated from a planned travel route.

SUMMARRY OF THE INVENTION

In carrying out the present invention and according to one aspect thereof, there is provided a mobile navigation apparatus comprising: current positional information generating means for detecting a current location of a mobile body and generating current positional information; map information storage means for storing map information including road information; display map information generating means for reading map information on a predetermined area from the map information storage means on the basis of the current positional information and generating display map information from the map information thus read, and display means for displaying the display map information and the current positional information; the mobile navigation apparatus further comprising: travel route planning means for planning a travel route of the mobile body on the basis of the road information; wherein, if the current location is deviated from the planned travel route, the display means shows a straight line connecting a shortest distance location on the planned travel route to the current location, the straight line making a shortest distance from the current location to the planned travel route.

Namely, according to the present invention, if a mobile body has deviated from a planned travel route, a straight line is displayed which connects a current location of the mobile body to a shortest distance location on the planned travel route which makes a shortest distance from the current location of the mobile body to the planned travel route. Consequently, the novel configuration facilitates the decision as to which direction to head the mobile body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 13 is a rectangular area map information table to be generated by executing the subroutine shown in FIG. 12;

DESCRIPTION OF THE PREFERRED EMBODIMENTS

Figure 1:
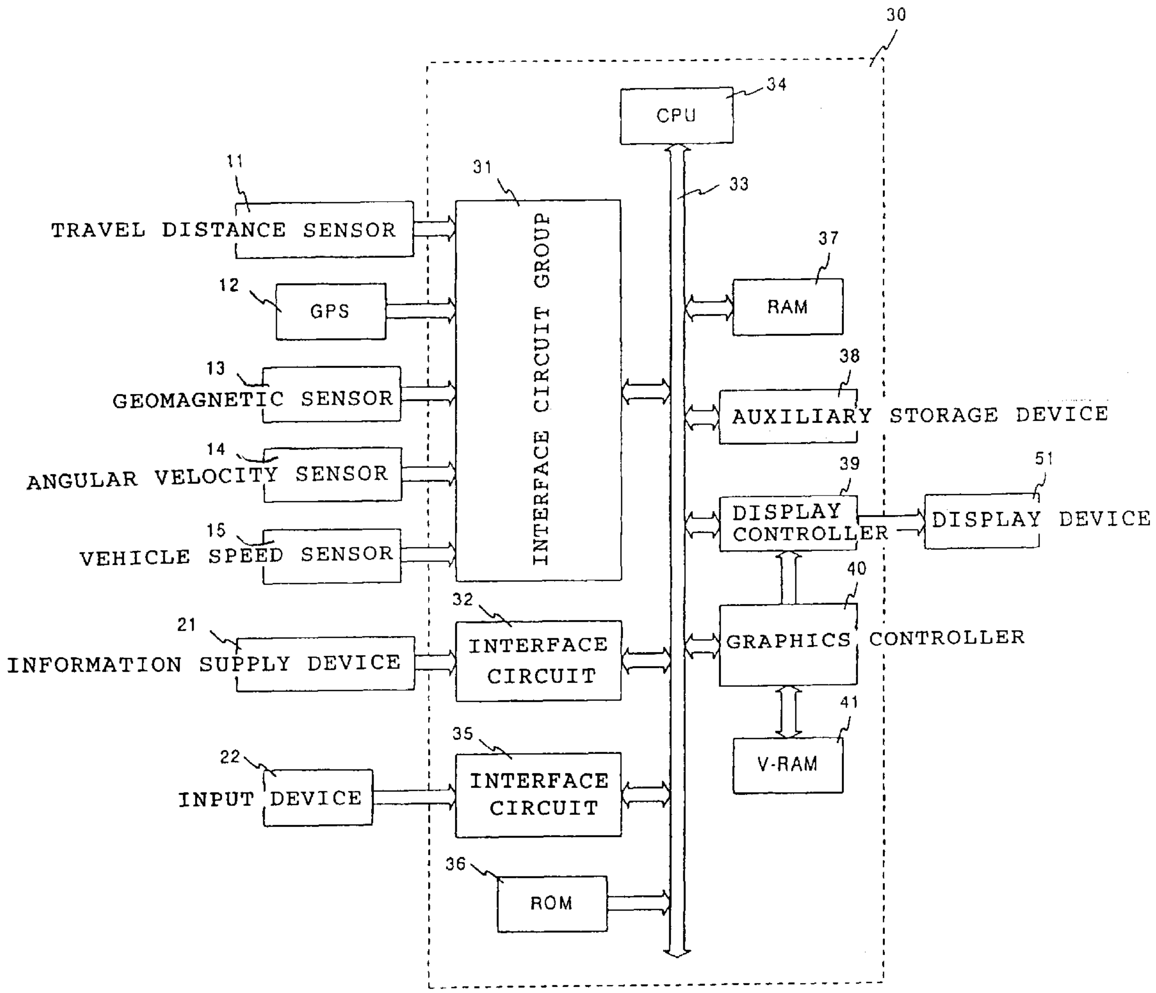
FIG. 1 is a block diagram illustrating a mobile navigation apparatus according to the present invention.

The present invention will now be described in further detail by way of example with reference to the accompanying drawings. Referring to FIG. 1, there is shown a block diagram illustrating an exemplary configuration of a mobile navigation apparatus according to the present invention. A travel distance sensor 11 detects a distance traveled by a mobile body such as a vehicle. A GPS (Global Positioning System) 12 detects a vehicle's current location from longitude and latitude information. A geomagnetic sensor 13 detects a bearing of the vehicle on the basis of geomagnetism (earths magnetism). An angular velocity sensor 14 detects an angular velocity of the vehicle. A vehicle speed sensor 15 detects a running speed of the vehicle on the basis of the number of pulses generated in proportion to the rotational angle of the drive shaft of the vehicle. The signals outputted from these sensors 11 through 15 are supplied to an interface circuit group 31. It should be noted that the GPS 12 is connected with a GPS antenna (not shown) for catching radio signals sent from an artificial satellite.

A map information supply device 21 is constituted by a CD-ROM drive or a DVD drive for reading map information from a nonvolatile recording medium such as CD-ROM or DVD. The map information read from the recording media is supplied to an interface circuit 32.

The interface circuit group 31 and the interface circuit 32 are connected to an input/output bus 33 of a controller 30. The input/output bus 33 is adapted to input/output data signals and address signals with a central processing unit (CPU) 34. The output signals of the above-mentioned sensors 11 through 15 and the map information read by the map information supply device 21 are read by a command issued by the CPU 34 in a predetermined timing relation, to be supplied to the input/output bus 33.

An input device 22 is connected to an interface circuit 35 which is connected to the input/output bus 33. Various commands issued from the input device 22 in response to driver's operations are supplied to the CPU 34 via the interface circuit 35. The input device 22 is constituted by a keyboard having an enter key (not shown) for entering the decision items shown on a display device 51 to be described later and a select key (not shown) for specifying locations on maps shown on the display device 51. In addition, the input device 22 may have a pointing device such as a mouse for specifying locations on maps shown on the display device 51. The input/output bus 33 is also connected to a ROM (Read Only Memory) 36 and a RAM (Random Access Memory) 37. The ROM 36 stores a program for displaying map information on the display device 51 and a program for generating rectangular area map information for example. On the other hand, the RAM 37 stores the map information of predetermined areas to be shown on the display device 51 and the variables of programs to be executed. The RAM 37 is constituted by a nonvolatile memory for example, which retains its contents after the power thereto is turned off. The present embodiment may also be configured so as to connect an auxiliary storage device 38 to the input/output bus 33 as shown in FIG. 1. The auxiliary storage device 38, composed of an IC card constituted by a nonvolatile memory and an interface circuit (not shown), stores information which is too large in size to be accommodated in the RAM 37.

The input/output bus 33 is further connected to a display controller 39 and a graphics controller 40. The display controller 39 is connected to the display device 51. The graphics controller 40 writes data to a V-RAM 41 and reads data therefrom as instructed by the CPU 34. The display controller 39 controls the display device 51 in accordance with the image information outputted from the graphics controller 40.

Figure 2:
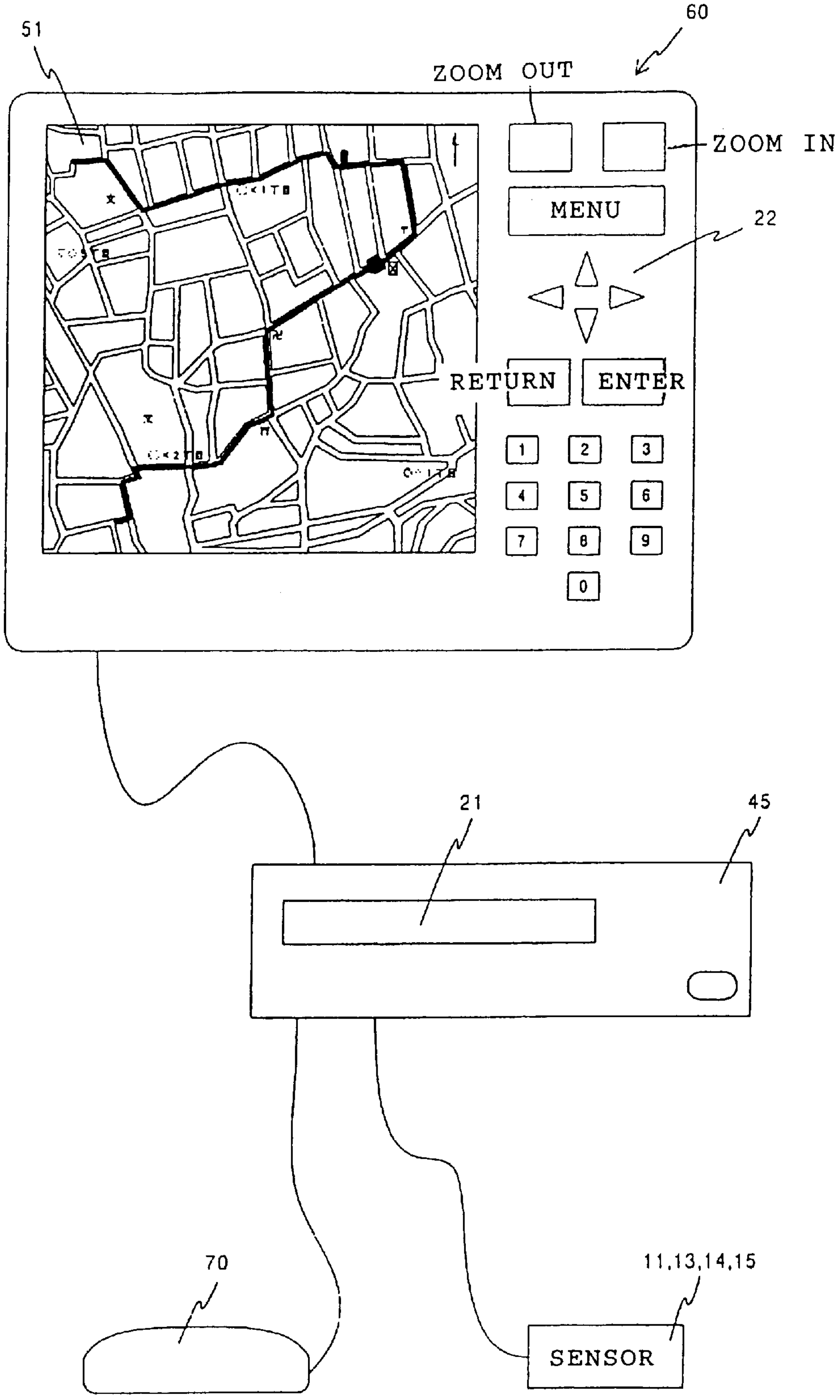
FIG. 2 is a schematic view of a first embodiment of the present invention.

Referring to FIG. 2, there is shown a configuration of the mobile navigation apparatus practiced as one embodiment of the present invention. A display input section 60 is composed of the display device 51 and the input device 22. The display device 51 shows symbols including a pentagonal shape indicative of current vehicle locations, map information, and a planned travel route to a destination. The input device 22 is composed of zoom-in and zoom-out keys for zooming in and out of the images shown on the display device 51, a menu key shown in a processing menu on the display device 51, triangular select keys for selecting processing items from the shown menu, an enter key for inputting a selected processing item, and a return key.

If the driver is required to set numeric values, preset values are shown on the display device 51 and the driver selects desired values by operating the above-mentioned select keys. If there is room in the key arrangement on the input device 22, ten keys may be disposed thereon as shown in FIG. 2, from which the driver directly inputs desired values.

The display input section 60 is connected to a controller 45 with a connection line. The controller 45 is connected to a GPS antenna 70 with an antenna line. Furthermore, the controller 45 is connected to sensors 11, 13, 14, and 15 such as the vehicle speed sensor mentioned above with a connection line. The controller 45 includes the controller 30, the GPS 12, and the map information supply device 21 shown in FIG. 1.

In this first embodiment, current positional information generating means is constituted by the travel distance sensor 11, the GPS sensor 12, the geomagnetic sensor 13, and the angular velocity sensor 14. Map information storage means is constituted by the map information supply device 21 and the RAM 37. Display map information generating means is constituted by the CPU 34, the ROM 36, the RAM 37, the V-RAM 41, and the input/output bus 33. Travel route planning means and reduction scale setting means are constituted by the a CPU 34, the ROM 36, the RAM 37, and the input/output bus 33. Display means is constituted by the display controller 39 and the display device 51.

The following description will be made on a supposition that the mobile navigation apparatus is in an active state and normally operating with the starting processing such as the initialization of the variables for use in the CPU 34 completed.

Figure 3:
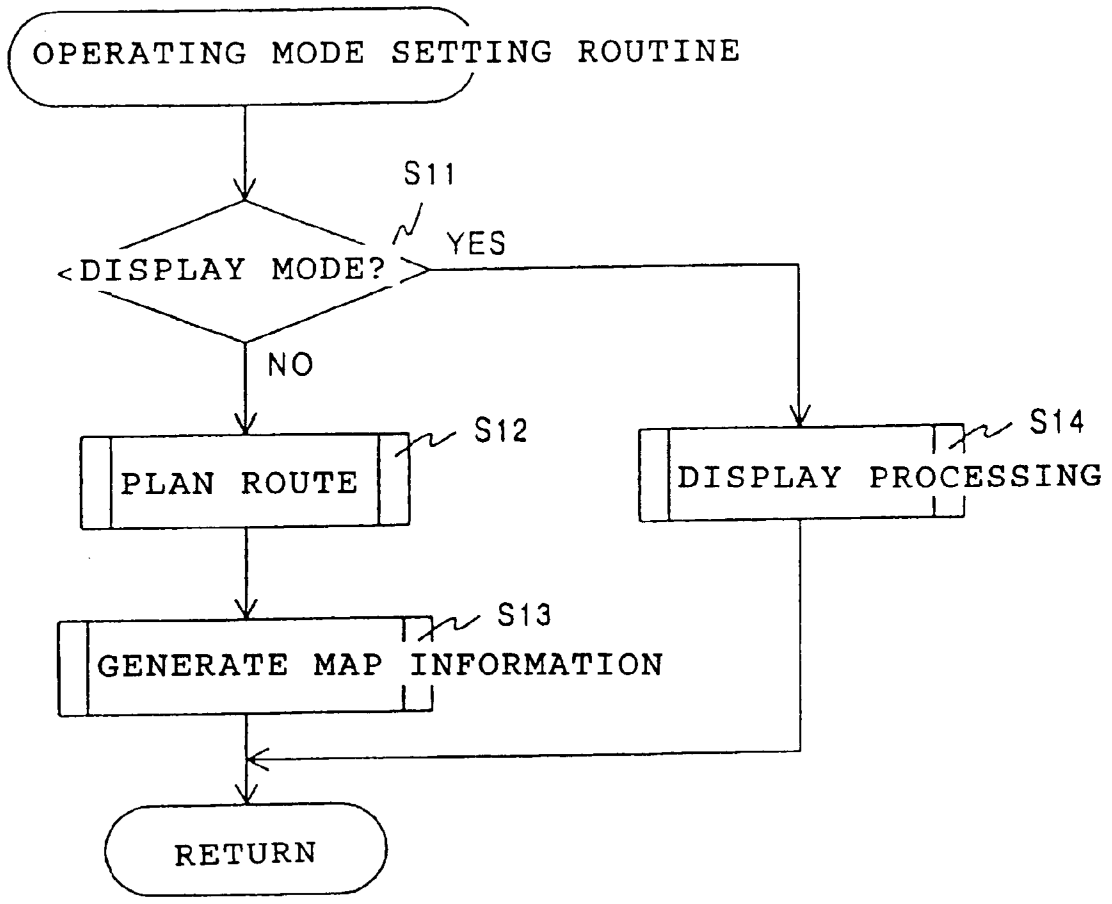
FIG. 3 is a flowchart of a subroutine for setting an operation mode of the mobile navigation apparatus.

Referring to FIG. 3, there is shown a subroutine for setting an operating mode of the mobile navigation apparatus. The operating mode is set when the driver selects a desired operating mode by operating corresponding keys such as the above-mentioned menu key.

First, a prompt is displayed on the display device 51 to make the driver select a travel route planning mode or a map information display mode (step S11). If the travel route planning mode is selected, a travel route planning subroutine to be described later is executed (step S12), map information is generated on the basis of the inputted settings (step S13), and then this subroutine is ended. On the other hand, if the map information display mode is selected, a display processing subroutine to be described later is executed (step S14) and then this subroutine is ended.

Figure 4:
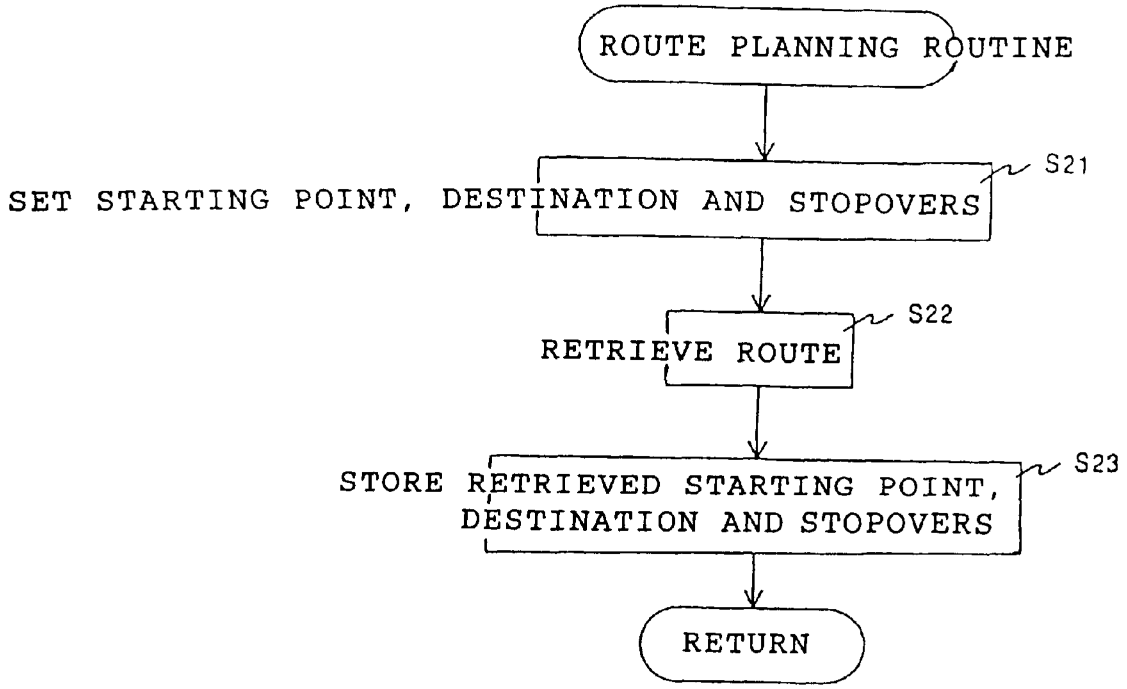
FIG. 4 is a flowchart of a subroutine for planning a vehicle's travel route.

Referring to FIG. 4, there is shown a subroutine for setting the above-mentioned travel route planning routine.

First, a starting point, a destination, and stopover are set through the input device 22 (step S21). For these settings, the coordinate information for these points, for example latitude and longitude data are set by the input operation made on the keyboard or the mouse. For the input operation, a map is shown on the display device 51 in advance and a pointer for specifying each point, for example a cross or an arrow, is superimposed on the displayed map. The driver moves this pointer by operating the keyboard or the mouse to each point to specify it. If there are two or more matching place names in the vicinity of a specified point, these place names may be shown on the display device 51 for selection by the select key. When one place name is determined, one piece of coordinate data corresponding to that place name can be retrieved. Moreover, for an easier input operation and/or a higher display visibility, a capability may be provided by which the maps shown on the display device 51 can be zoomed in and out by operating a "zoom-in" key and a "zoom-out" key. For example, let the starting point be $P_1$, the destination be $P_n$, and the stopovers be $P_2$, . . . (omitted) . . . , $P_i$ . . . (omitted) . . . , $P_{n-1}$. Sections between two continuous points, such as $P_1$–$P_2$ and $P_i$–$P_i$, are called 2-point sections.

A route along which the vehicle as a mobile body is to travel is searched for on the map shown in display device 51 from the coordinate information on $P_1$ through $P_n$ and the road information included in the map information and the retrieved route is set (step S22). It should be noted that, for the route search processing, known methods are disclosed in Japanese Patent Laid-open No. Hei 7-55481 and Hei 7-91971 for example. If there are two or more possible routes in a 2-point section, they may be shown on the map for selection by the driver by means of a pointer shown on the display device 51 as with the above-mentioned place name selection by use of the keyboard or the mouse. In what follows, a route set in 2-point section $P_1$–$P_2$ is referred to as $r_i$, a route set in 2-point section $P_i$–$P_{i-1}$ as $r_i$, a route set in 2-point section $P_{n-1}$–$P_n$ as $r_{n-1}$. Each route set in each 2-point section is referred to as $r_i$(i=1, . . . (omitted) . . . , n−1). Next, the starting point, the destination, and the stopovers set in step S21 and the routes retrieved in step S22 are stored in the RAM 37 (step S23), upon which this subroutine comes to an end. In what follows, the above-mentioned starting point, destination, and stopovers are referred to as planned route information.

Figure 5:
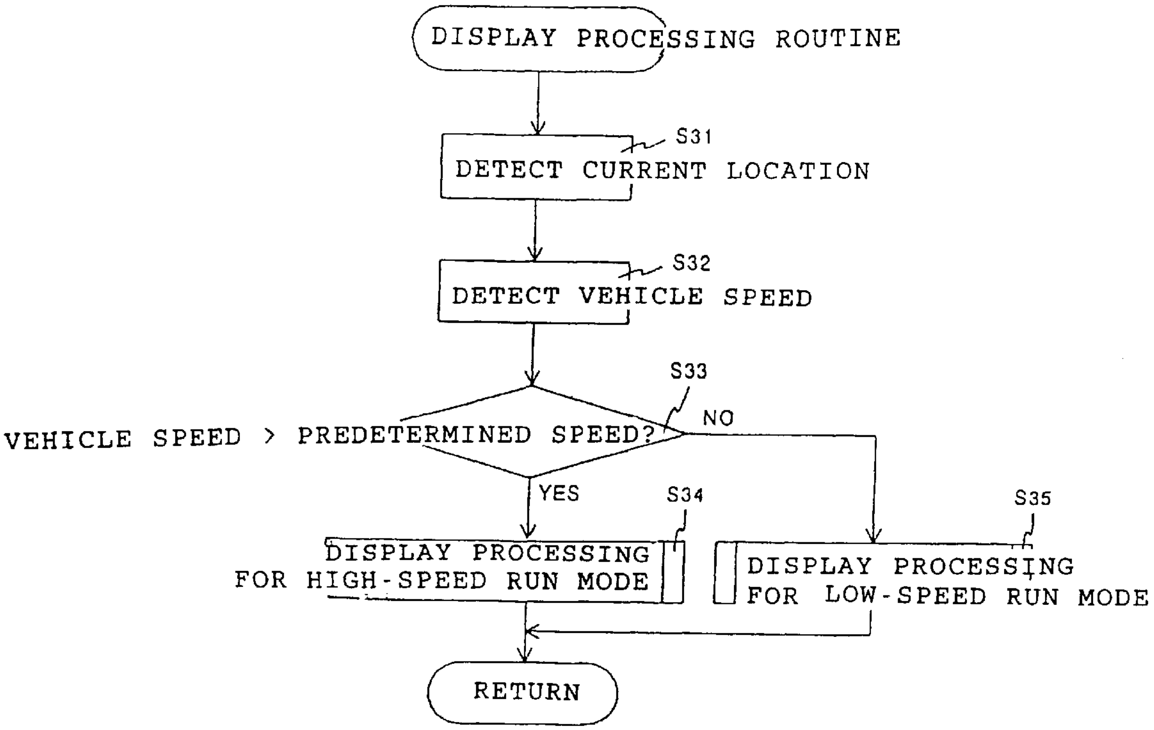
FIG. 5 is a flowchart of a subroutine for changing the displayed information in accordance with a vehicle's speed.

Referring to FIG. 5, there is shown a display processing subroutine to be executed when the map information display mode is selected in step S14 shown in FIG. 3. It should be noted that this subroutine is called, in a predetermined timed relation, from the main routine being executed by the CPU 34.

First, a vehicle's starting point is detected from the GPS 12 and the current location data are retrieved (step S31). Next, a vehicle speed is detected (step S32). The vehicle speed is obtained on the basis of the signal outputted from the vehicle speed sensor 15. Alternatively, the vehicle velocity may be obtained by computing the vehicle's current positional data sequentially supplied from the GPS 12 in step S31.

Next, it is determined whether the vehicle speed is greater than or equal to a predetermined speed, for example 4 km/hour (step S33). If the decision is yes, a display process in the high-speed run mode to be described later is executed (step S34), upon which this subroutine comes to an end. On the other hand, if the vehicle speed is found lower than the predetermined speed, a display process in the low-speed run mode to be described later is executed (step S35), upon which this subroutine comes to an end.

It should be noted that the above-mentioned predetermined speed may be one stored in the ROM 36 beforehand or specified by the driver.

Figure 6:
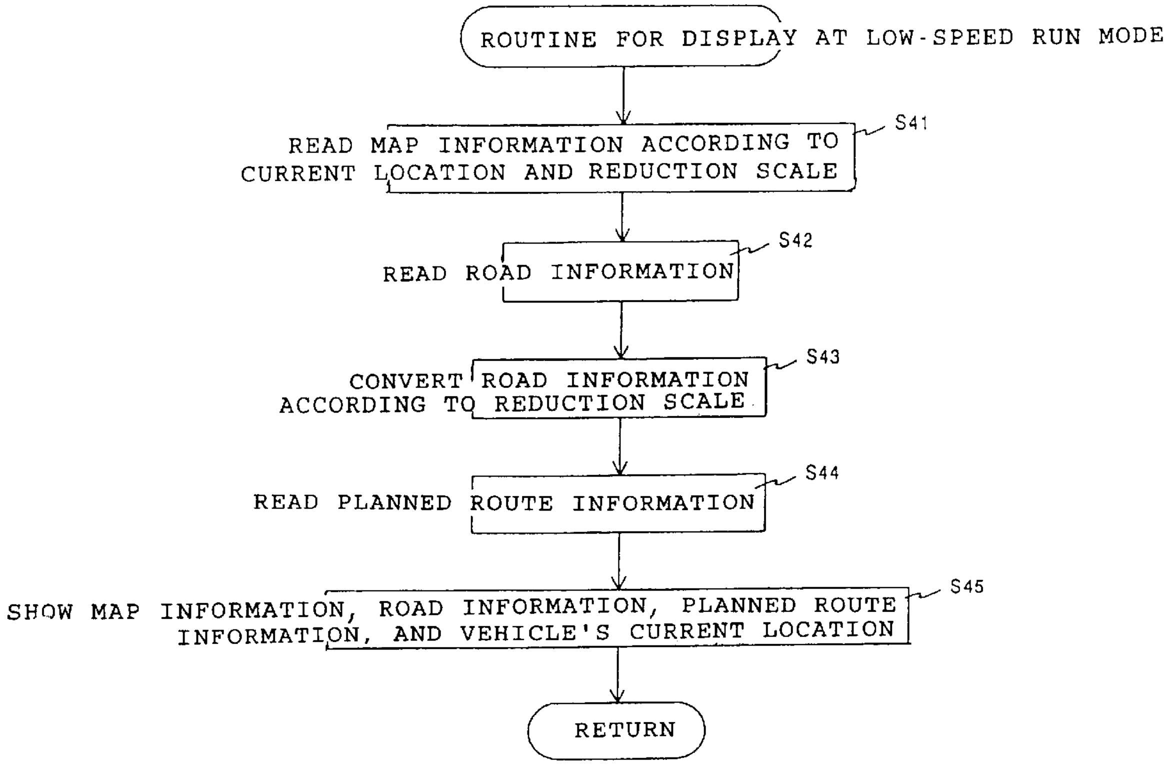
FIG. 6 is a flowchart of a subroutine for display processing to be executed in the low-speed run mode.

Referring to FIG. 6, there is shown a subroutine to be executed in step S35 in the low-speed run mode or in a stopped state for example.

First, the map information on a predetermined area is read from the map information supply device 21 in accordance with the vehicle's current positional information and a preset reduction scale (step S41) and the retrieved map information is stored in the RAM 37. This reduction scale is determined by selecting a scale level, which is executed by the driver by operating the zoom-out key or the zoom-in key of the input device 22 shown in FIG. 2. The recording medium such as a CD-ROM or DVD contains the map information corresponding to plural scale levels. For example, in the case of a CD-ROM from which the map information from all over Japan can be read with 14 scale levels, each piece of map information from all over Japan corresponding to each of the scale levels 1 through 14 is stored. When one of the scale levels is selected in step S41, the map information corresponding to the selected scale level is read from the CD-ROM and shown on the display device 51.

After the process of step S41, road information is read from the map information supply device 21 (step S42). This road information is stored in the recording medium such as a CD-ROM or DVD as vector data. The road information read from the recording medium is processed in accordance with the scale level selected in step S41 to be converted into display data to be shown on the display device 51 (step S43).

The planned route information planned in step S23 shown in FIG. 4 is read from the RAM 37 (step S44). The map information read from the RAM 37 and the converted road information are shown on the display device 51 (step S45), upon which this subroutine comes to an end.

Figure 7:
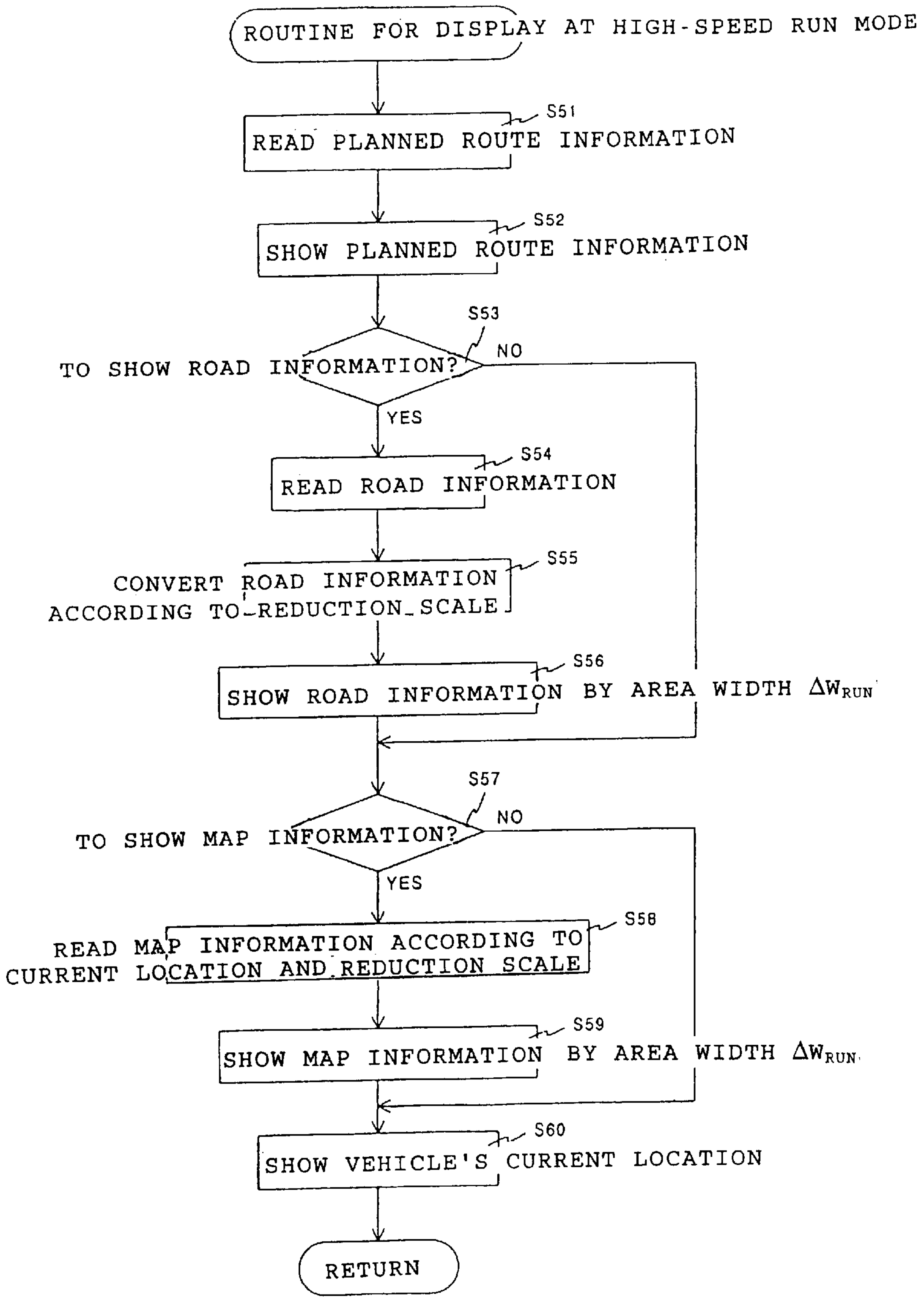
FIG. 7 is a flowchart of a subroutine for display processing to be executed in the high-speed run mode.

If the vehicle speed is found higher than the predetermined speed in step S33 of the subroutine shown in FIG. 5, the display processing in the high-speed run mode as shown in FIG. 7 is executed.

First, the planned route information planned in step S23 shown in FIG. 4 is read from the RAM 37 (step S51) and shown on the display device 51 (step S52).

Next, it is determined whether the displaying of the road information has been set or not (step S53). This setting is made by the driver beforehand. For example, when the driver operates the menu key of the input device 22 shown in FIG. 2, a setting screen is shown on the display device 51, on which the driver selects or does not select the displaying of the road information. If the displaying of the road information is selected in step S53, the road information is read from the map information supply device 21 (step S54). This road information is stored in the recording medium such as a CD-ROM or DVD as vector data as described above. The road information read from the recording medium is converted into display data in accordance with the preset scale level (step S55). The converted road information is then shown on the display device 51 along the planned travel route by a predetermined area width $\Delta W_{RUN}$, for example 3 km (step S56). On the other hand, if the road information is determined not to be shown, this subroutine goes to step S57 without showing the road information.

Next, it is determined whether the setting for showing the map information has been made or not (step S57). This setting is selected by the driver beforehand as with the setting for road information displaying described above. If the displaying is determined, the map information corresponding to a predetermined area is read from the map information supply device 21 in accordance with the vehicle's current positional information and the preset scale level (step S58) to be stored in the RAM 37. The map information, of the read map information, included in a rectangular area extending along the planned route is then shown on the display device 51 by an area width $\Delta W_{RUN}$, for example 3 km (step S59), the vehicle's current location is shown (step S60), and this subroutine comes to an end.

It should be noted that the value of the area width $\Delta W_{RUN}$ used in steps S56 and S58 may be a default value as stored in the ROM 36 or may be set by the driver.

If no new map information needs to be read when reading the map information from the map information supply device 21 in steps S41 and S58, for example, if the vehicle travel distance obtained from the current location detected in step S31 described above is small enough for requiring no updating of the map information stored in the RAM 37, the rectangular area map information may be generated by use of the map information currently stored in the RAM 37 or the data corresponding to areas other than the rectangular area may be deleted by manipulating the display information currently stored in the V-RAM 41.

In the above-mentioned embodiment, it is determined in step S33 if the vehicle speed is higher than one predetermined speed and the subroutine branches to two processes for displaying in a low-speed run mode and displaying in a high-speed run mode to show the display information such as the map information. It will be apparent to those skilled in the art that the vehicle speed may be compared with two or more predetermined speeds to show resultant display information.

Furthermore, the above-mentioned area width $\Delta W_{RUN}$ of the road information to be shown in step S56 or the above-mentioned area width $\Delta W_{RUN}$ of the map information to be displayed in step S59 may be changed in accordance with the vehicle speed. For example, the area width $\Delta W_{RUN}$ may be changed in proportion to the vehicle speed or the area width $\Delta W_{RUN}$ may be obtained from the vehicle speed by executing a computation by use of a predetermined function.

In the above-mentioned embodiment, it is determined in step S53 if the road information is to be shown or not and it is determined in step S57 if the map information is to be shown or not. It will be apparent to those skilled in the art that, without making these decisions, the present embodiment may be configured in which no road information is shown in the high-speed run mode, or the road information and the map information is not shown.

Figure 8:
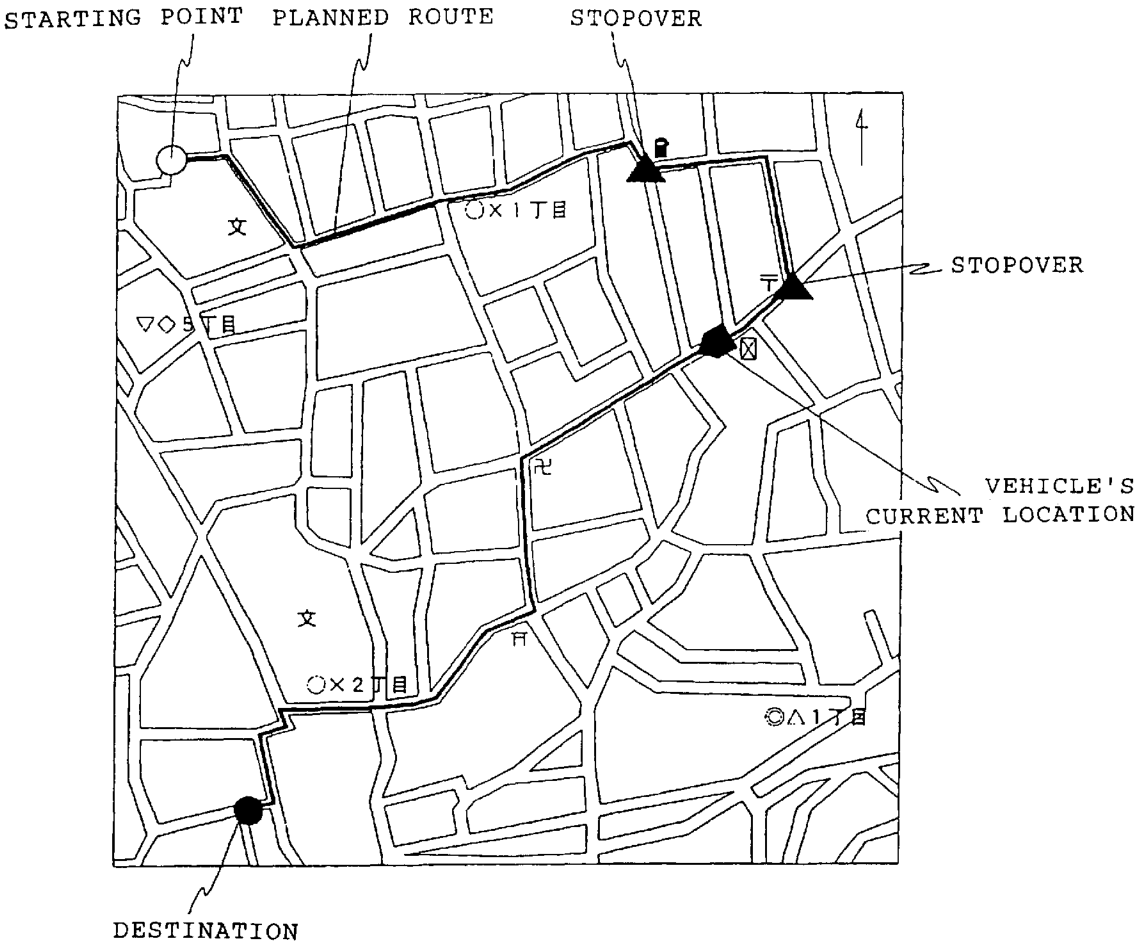
FIG. 8 is a diagram illustrating an example of map information to be displayed in the low-speed run mode.

Referring to FIG. 8, there is shown an example of the above-mentioned map information, road information, planned route information, and vehicle's current location displayed in step S45.

As shown in FIG. 8, the display device 51 shows the map information such as particular symbols representing a school and a post office, the road information indicative of roads, and the vehicle's current location represented by a black pentagonal marker. In addition, the display device 51 shows planned route information including the planned route represented by thick solid lines, the starting point represented by a white circle in the upper left corner, two stopovers represented by black triangles in the upper right corner, and the destination represented by a black circle in the lower left corner. Executing the process of step S45 shown in FIG. 6 shows these pieces of information on the display device 51 in the low-speed run mode of the vehicle.

Figure 9:
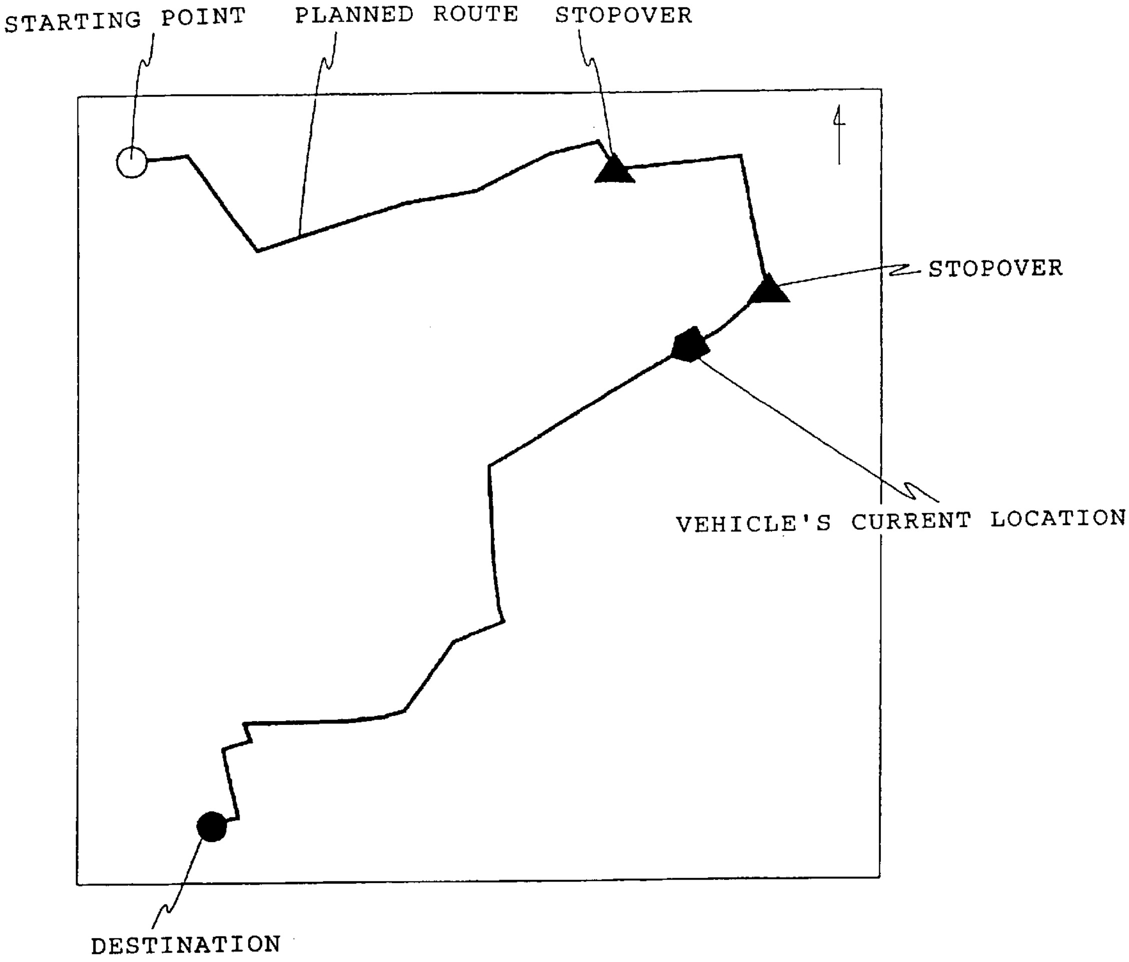
FIG. 9 is a diagram illustrating an example of route information to be displayed in the high-speed run mode.

Referring to FIG. 9, there is shown one example of the display information shown on the display device 51 in the high-speed run mode. Shown in FIG. 9 is the display information to be displayed on the display device 51 if it was determined in step S53 shown in FIG. 7 that the road information is not displayed and if it was determined in step S57 that the map information is not displayed. In this case only the vehicle's current location represented by a black pentagonal marker and the planned route information such as the planned route and destination are displayed on the display device 51 as shown in FIG. 9.

Figure 10:
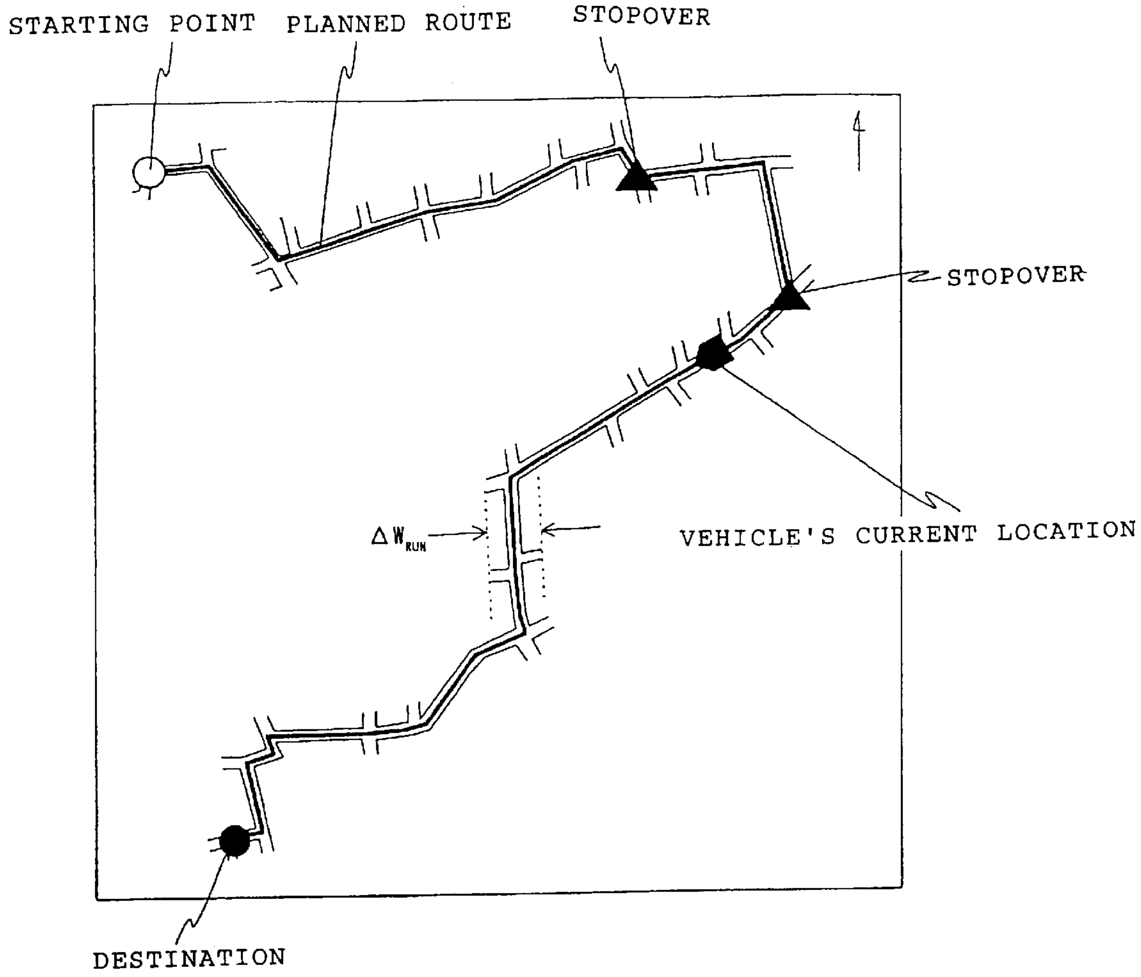
FIG. 10 is a diagram illustrating an example of route information and road information to be displayed in the high-speed run mode.

Referring to FIG. 10, there is shown a second example of the display information to be shown on the display device 51 in the high-speed run mode. Shown in FIG. 10 is the display information to be displayed on the display device 51 when both the vehicle's current location and the planned route information are to be displayed in the high-speed run mode, namely if it was determined in step S53 shown in FIG. 7 that the road information is to be displayed and if it was determined in step S57 that the map information is not to be displayed. As shown in FIG. 10, the vehicle's current location represented by a black pentagonal marker and the planned route information including the planned route and the destination are shown. In addition, the road information along the planned route having an area width $\Delta W_{RUN}$ is displayed on the display device 51. As shown in FIG. 10, showing the road information attached with the area width $\Delta W_{RUN}$ allows the displaying of the positional information about intersections.

Figure 11:
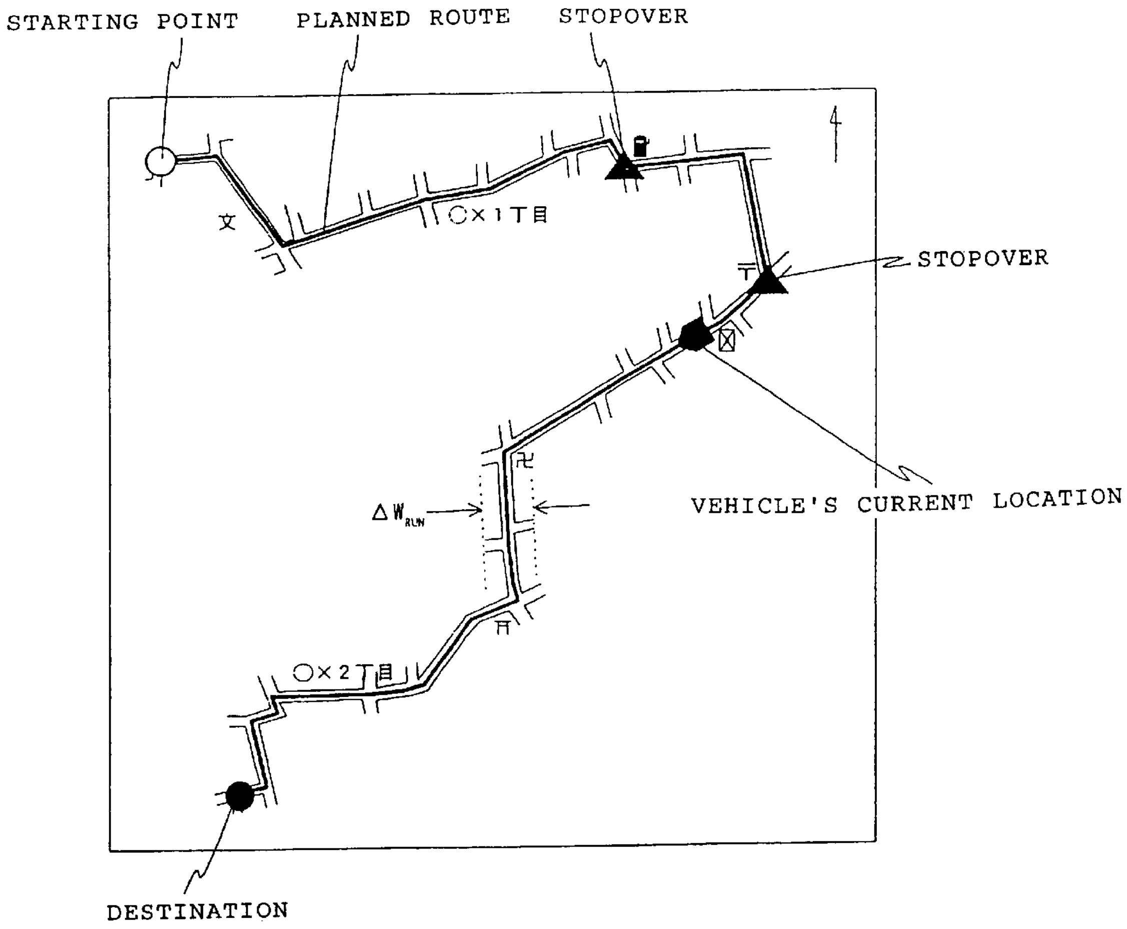
FIG. 11 is a diagram illustrating an example of route information, road information, and map information to be displayed in the high-speed run mode.

Referring to FIG. 11, there is shown a third example of the display information to be displayed on the display device 51 in the high-speed run mode. Shown in FIG. 10 is the display information to be displayed on the display device 51 when the vehicle's current location, the planned route information, the road information, and the map information are to be displayed in the high-speed run mode, namely if it was determined in step S53 shown in FIG. 7 that the road information is to be displayed and if it was determined in step S57 that the map information is to be displayed. As shown in FIG. 10, showing the map information such as place names and facilities in an area width $\Delta W_{RUN}$, along the planned route allows the showing of display information more detailed that those shown in FIGS. 9 and 10.

As shown in FIGS. 8, 9, 10, and 11, all of the above-mentioned information is displayed in the low-speed run mode and only the information required by the driver is displayed in the high-speed run mode. Consequently, the driver can get the appropriate information in accordance with the running states of the vehicle.

In the above-mentioned examples, the road information on the area width $\Delta W_{RUN}$ along the planned route is displayed in the high-speed run mode. It is also practicable to show only main roads such as national roads and express highways.

In the case where a vehicle's current location is corrected by providing consistency between the vehicle current positional information obtained from the sensors and the road information, namely so-called map matching is executed. The vehicle's current location can be corrected quickly and easily by executing map matching only on the road information about the planned road shown on the display device.

In the above-mentioned first embodiment, the map information is read for display from a recording medium such as a CD-ROM or DVD as shown in FIG. 2. It will be apparent to those skilled in the art that the map information about predetermined areas may be stored in the auxiliary storage device, an IC card which is the auxiliary storage device 38 shown in FIG. 1 for example and the map information is read therefrom. It should be noted that, if the storage space of an internal memory of the apparatus, the RAM 37 shown in FIG. 1 for example, is larger than the size of the map information to be stored, the map information may be stored in the internal memory. In this case, it is desirable for the auxiliary memory or the internal memory to be a nonvolatile memory such as the nonvolatile RAM, which retains its content even after its power is turned off. The following describes an example in which the map information is stored in the auxiliary memory or the internal memory beforehand and is displayed as read therefrom.

Figure 12:
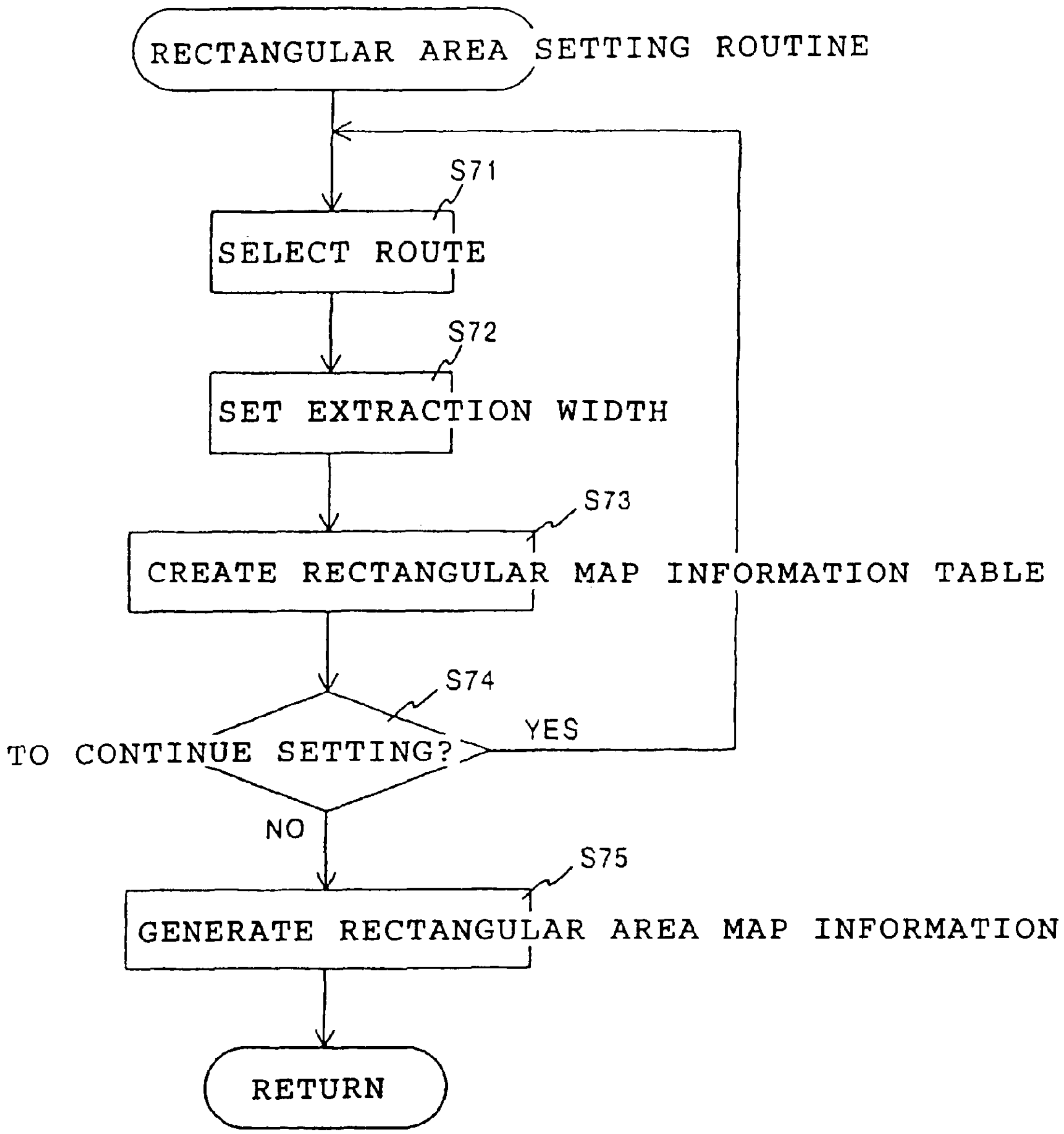
FIG. 12 is a flowchart of a subroutine for generating rectangular area map information.

Referring to FIG. 12, there is shown a subroutine for setting a rectangular area. It should be noted that this subroutine is called for execution after the process of step S23 of the subroutine shown in FIG. 4 for example. This subroutine generates the road information about a rectangular area having area width $\Delta W_{RUN}$ described above and the rectangular area map information having ΔW to be described later.

First, the driver inputs values 1 through n−1 indicative of route $r_i$ (i=1, . . . (omitted) . . . , n−1) by operating the numeric keys on the input device 22 to select a route to which an extraction width is set (step S71). It should be noted that two or more routes may be selected in this route selection. Next, in order to set the extraction width of the selected route, the driver inputs the extraction width in units of kilometers by operating the numeric keys on the input device 22 (step S72). In this extraction width setting, a map may be shown on the display device 51 in a superimposed manner and the extraction width may be incremented or decremented by operating the select key and the mouse. It should be noted that the extraction width may be set to zero, in which case the map information corresponding to the rectangular area is not extracted; instead, only the road information is extracted. If a road having no branches or an express highway is selected as the route $r_i$, the rectangular area map information is not required so often, so that setting the extraction width to zero can reduce the storage size required by the map information to be generated. In what follows, the extraction width of route $r_i$ is referred to as $\Delta w_i$, the extraction width of route $r_{n-1}$ as $\Delta w_{n'1\ 1}$. Namely, the extraction width of each of routes $r_i$ is referred to as $\Delta w_i$ . . . (omitted) . . . , n−1).

Next, from the settings inputted above, a rectangular area map information table as shown in FIG. 13 is generated in the RAM 37 (step S73). FIG. 13 shows planned routes $r_i$ (i=1, . . . (omitted) . . . , n−1) in the first column, section distances $L_i$ (i=1, . . . (omitted) . . . , n−1) corresponding to the routes $r_i$ in the second column, extraction widths $\Delta w_i$ (i=1, . . . (omitted) . . . , n−1) corresponding to the routes $r_i$ in the third column, and necessary storage capacities $L_i \times \Delta w_i$ (i=1, . . . (omitted). . . , n−1) obtained by multiplying section distance $L_i$ by extraction width $\Delta w_i$ corresponding to the routes $r_i$, in the fourth column. It should be noted that the section distance is obtained from the road information included in the map information. The size of the map information is determined by the dimension of the area concerned. Computing the area dimension can obtain the storage space necessary for the map information to be generated. The storage space necessary for the rectangular area map information can be obtained by computing a sum of the necessary storage capacities listed in the fourth column of FIG. 13.

Next, a prompt is shown on the display device 51 for the driver to continue the setting operation (step S74). To continue the setting operation, the subroutine returns to step S71 in which the driver enters settings. If the setting operation is not required anymore, the rectangular area map information is generated (step S75), upon which this subroutine comes to an end.

Figure 14:
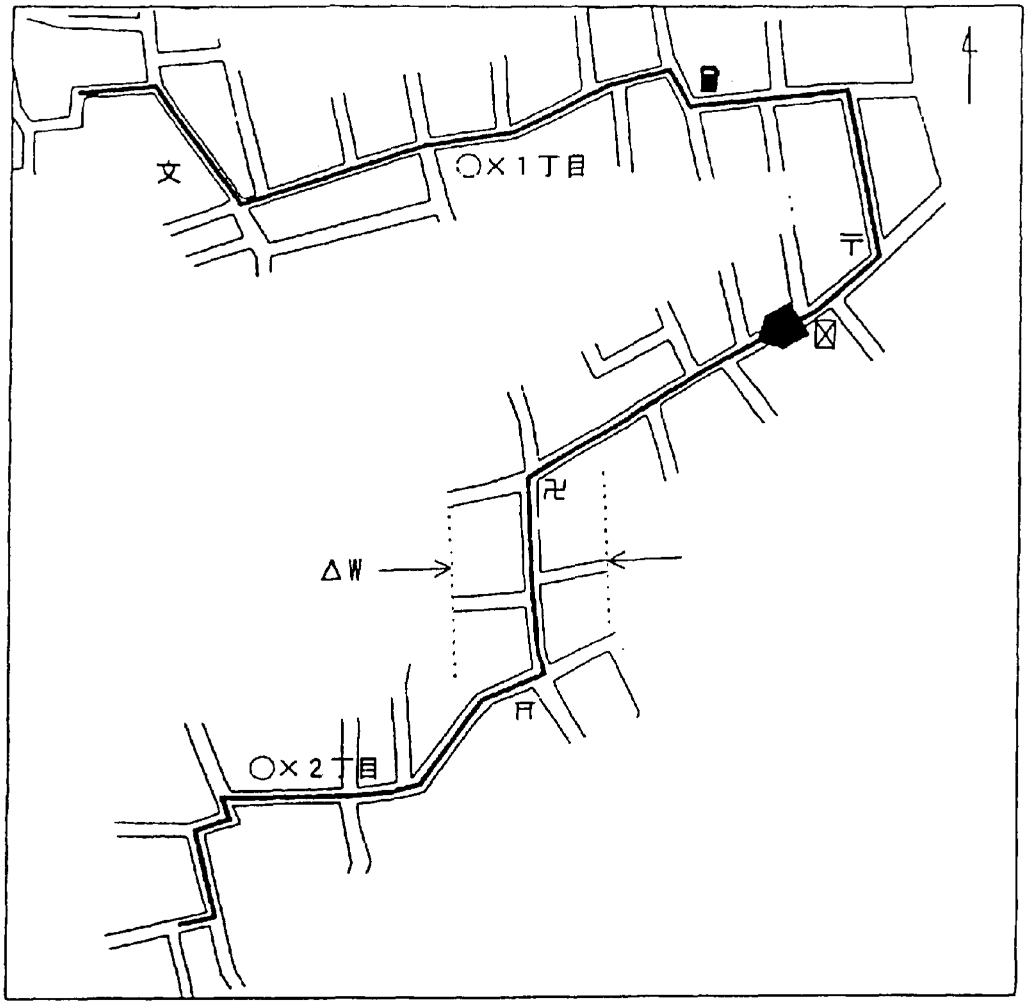
FIG. 14 is a diagram illustrating an example of route information, road information, and rectangular area map information to be generated by the subroutine shown in FIG. 12 and displayed in the high-speed run mode.

Referring to FIG. 14, there is shown one example of the rectangular area map information generated by the above-mentioned rectangular area setting routine. It should be noted that the map information corresponding to the various kinds of map information shown in FIGS. 8 through 11 is denoted by similar symbols. The rectangular area map information shown in FIG. 14 was generated with the extraction width of each rectangular area being a constant width ΔW. Thus, the map information to be stored in the memory is generated as the rectangular area map information, thereby reducing the storage space necessary for storing the generated map information.

As described, if the configuration in which the extracted rectangular area map information is stored in a memory such as an auxiliary storage device beforehand is used, the rectangular area map information with width ΔW as shown in FIG. 14 is read from the auxiliary storage device 38 and this rectangular area map information, the planned route information, the road information, and the vehicle's current positional information are shown on the display device 51 in the low-speed run mode. In the high-speed run mode, the display information such as the route information shown in FIG. 9, 10, or 11 is shown, thereby making it unnecessary to read the map information from a storage medium such as CD-ROM.

In the above-mentioned embodiments, the map information is extracted with the shape of each area extending along the planned route being rectangular. It will be apparent to those skilled in the art that a shape other than a rectangular shape may be used as the shape of each area extending along the planned route.

In the first embodiment described with reference to FIGS. 2 through 11, the map information is read from a storage medium such as a CD-ROM or the RAM 37. Every time the map information is read, the rectangular area map information with area width $\Delta W_{RUN}$ is generated as the map information to be shown in the high-speed run mode. It is also practicable, in the first embodiment, to generate the rectangular area map information with area width $\Delta W_{RUN}$ by executing the subroutine shown in FIG. 12 and store the generated information in the auxiliary storage device 38 in advance. In this case, when displaying the map information in the high-speed run mode, namely when displaying the map information in step S59 of FIG. 7, the rectangular area map information with area width $\Delta W_{RUN}$ may be read from the auxiliary storage device 38 to be shown on the display device 51.

Figure 15:
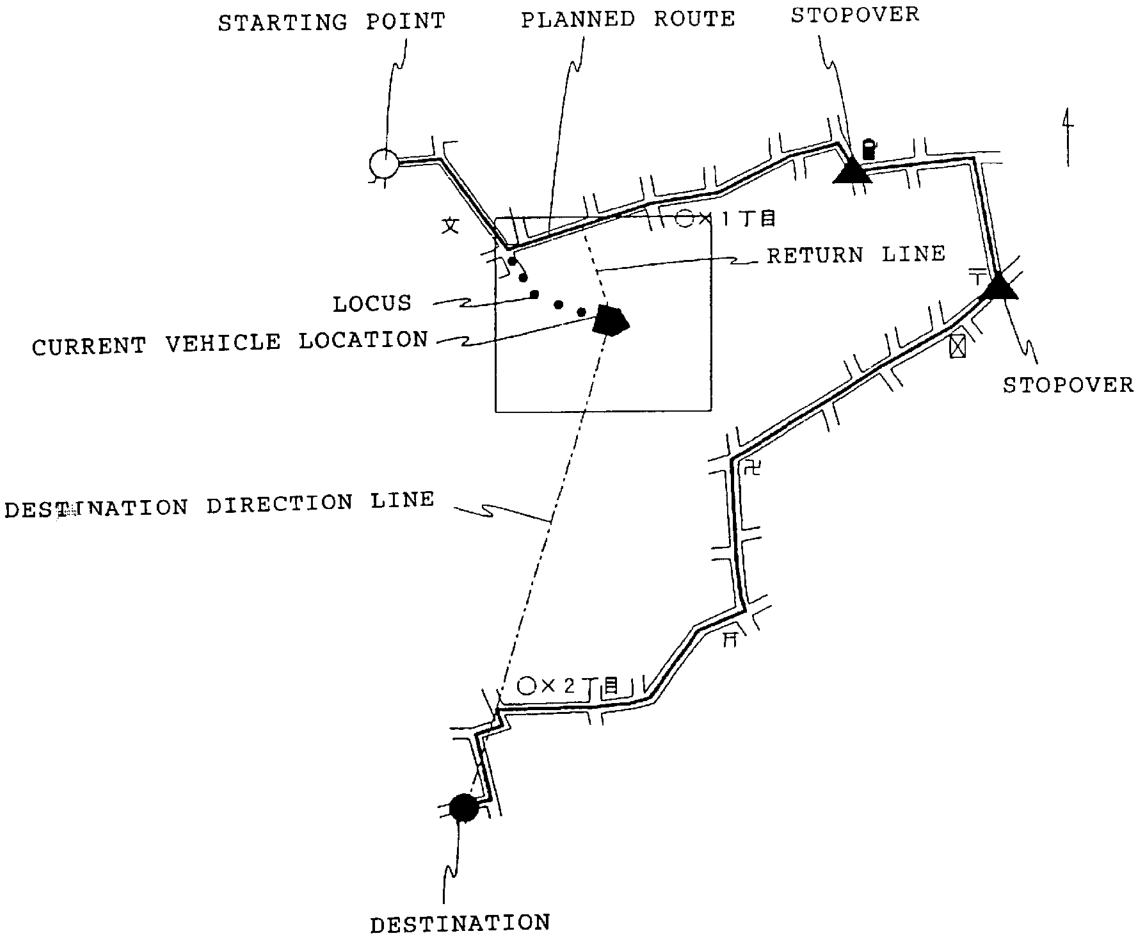
FIG. 15 is a diagram illustrating an example to be displayed when the vehicle deviates from the planned route.
Figure 16:
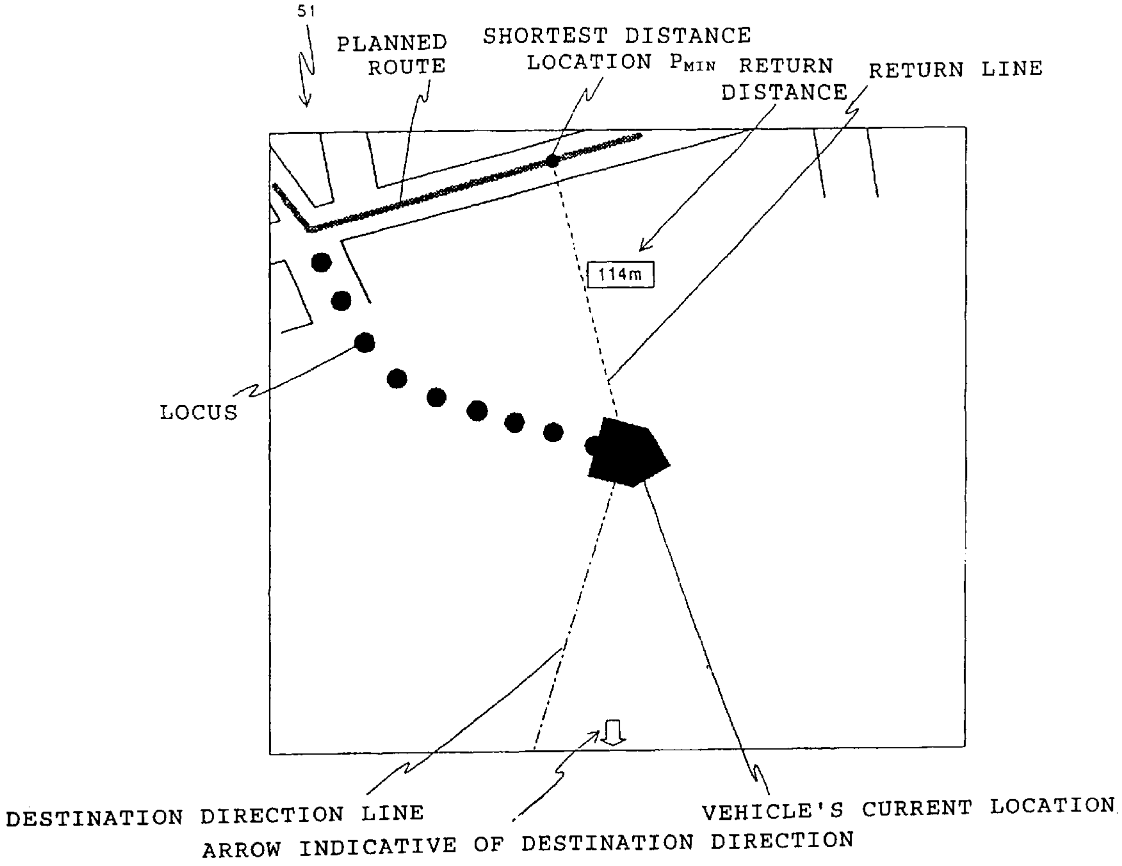
FIG. 16 is a diagram illustrating an enlargement of an area indicative by a square in FIG. 15.

In the above-mentioned configuration in which the rectangular area map information is shown on the display device 51, if the vehicle deviates from the planned travel route, the vehicle's current location is shown in an area for which no map information is shown. Examples of this case are shown in FIGS. 15 and 16. FIG. 15 depicts the planned route in its entirety, in which the information in a square area is shown on the display device 51. FIG. 16 depicts an enlargement of the square area shown in FIG. 15.

In FIGS. 15 and 16, black pentagonal markers denote the vehicle's current location and black dots denote a locus of the vehicle. A dashed line and a phantom line denote a return line and a destination direction line respectively to be described later.

The return line indicates a location on the planned route at which the straight line distance from the vehicle's current location to the planned route is the shortest (this location is hereinafter referred to as a shortest distance location). In FIG. 16, the shortest distance location is denoted by $P_{MIN}$. The destination direction line is a straight line from the vehicle's current location to the destination. Displaying the return line and the destination direction line on the display device 51 allows, if the vehicle has moved to a location for which no rectangular area map information is displayed, the vehicle to return to the planned travel route or reach the destination by heading the vehicle along the return line or the destination direction line.

Figure 17:
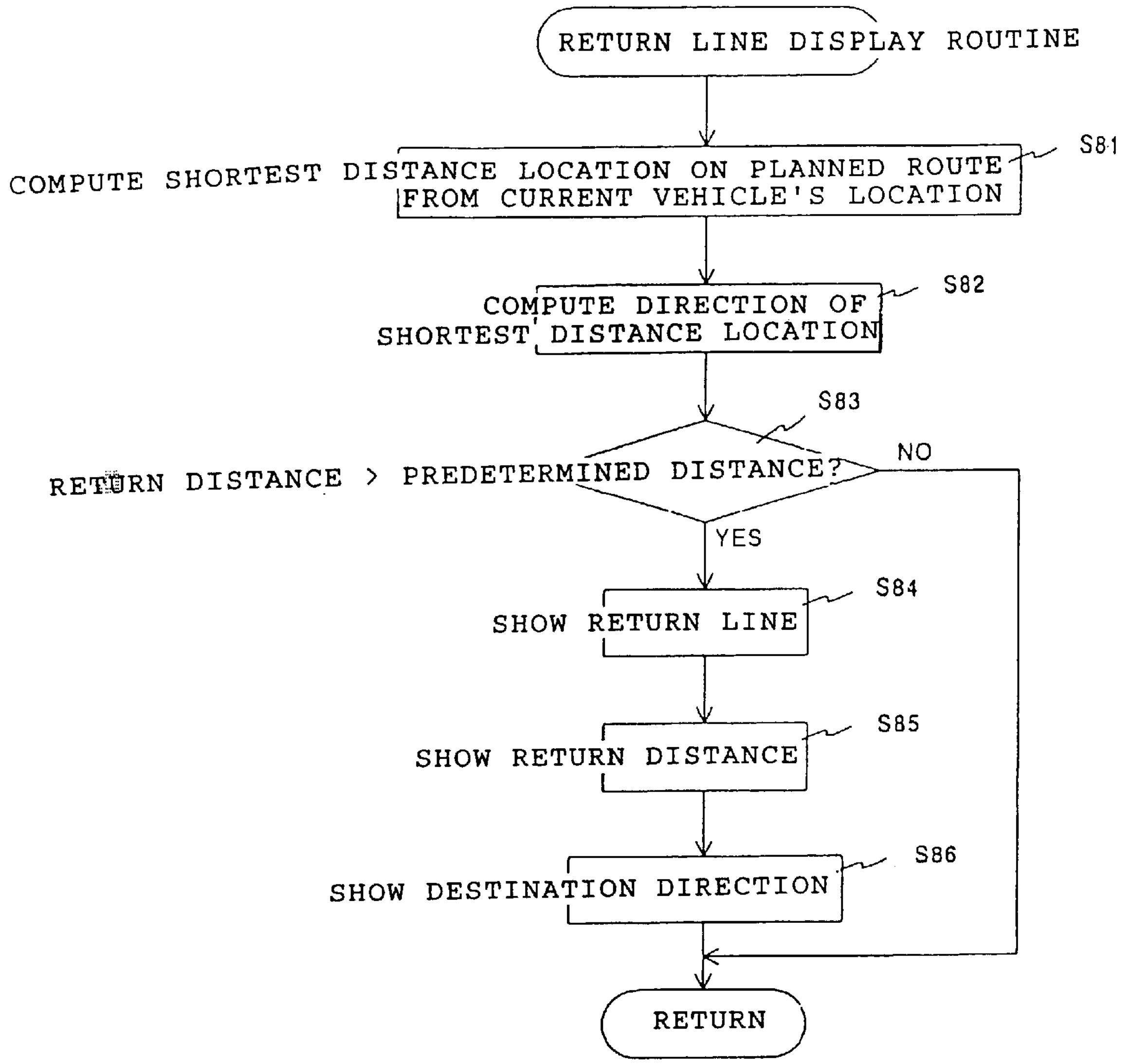
FIG. 17 is a flowchart of a subroutine for displaying a return line.

Referring to FIG. 17, there is shown a subroutine for displaying the abovementioned return line.

First, the above-mentioned shortest distance location $P_{MIN}$ is computed from the vehicle's current positional data and the planned route information (step S81). In what follows, the straight line from the vehicle's current location to the shortest distance location $P_{MIN}$ is referred to as a return distance. Next, the direction of the shortest distance location $P_{MIN}$ viewed from the vehicle's current location is computed (step S82). Then, it is determined whether the return distance is greater than or equal to a predetermined distance (step S83). This predetermined distance may be a default value, 50 meters for example, or may be changed in accordance with the reduction scale level for showing the map information on the display device 51.

If the return distance is found less than the predetermined distance in step S83, the subroutine ends immediately. If the return distance is found greater than or equal to the predetermined distance, the return line is shown on the display device 51 (step S84). As described above, in the example shown in FIG. 16, the dashed line from the vehicle's current location to the shortest distance location $P_{MIN}$ is the return line. It should be noted that, in this example, the return line is directed approximately vertical to the planned route. Next, the return distance is shown at a predetermined location on the display device 51, in the vicinity of the return line for example, (step S85), then the direction of the destination as viewed from the vehicle's current location is computed and an arrow marker indicative of the destination is shown in the vicinity of one end side of the display device 51 (step S86), upon which this subroutine comes to an end. In the example shown in FIG. 16, "114 m " shown besides the return line is the return distance. In FIG. 16, the arrow marker pointing at the destination is a hollow arrow shown at the lower center.

Figure 18:
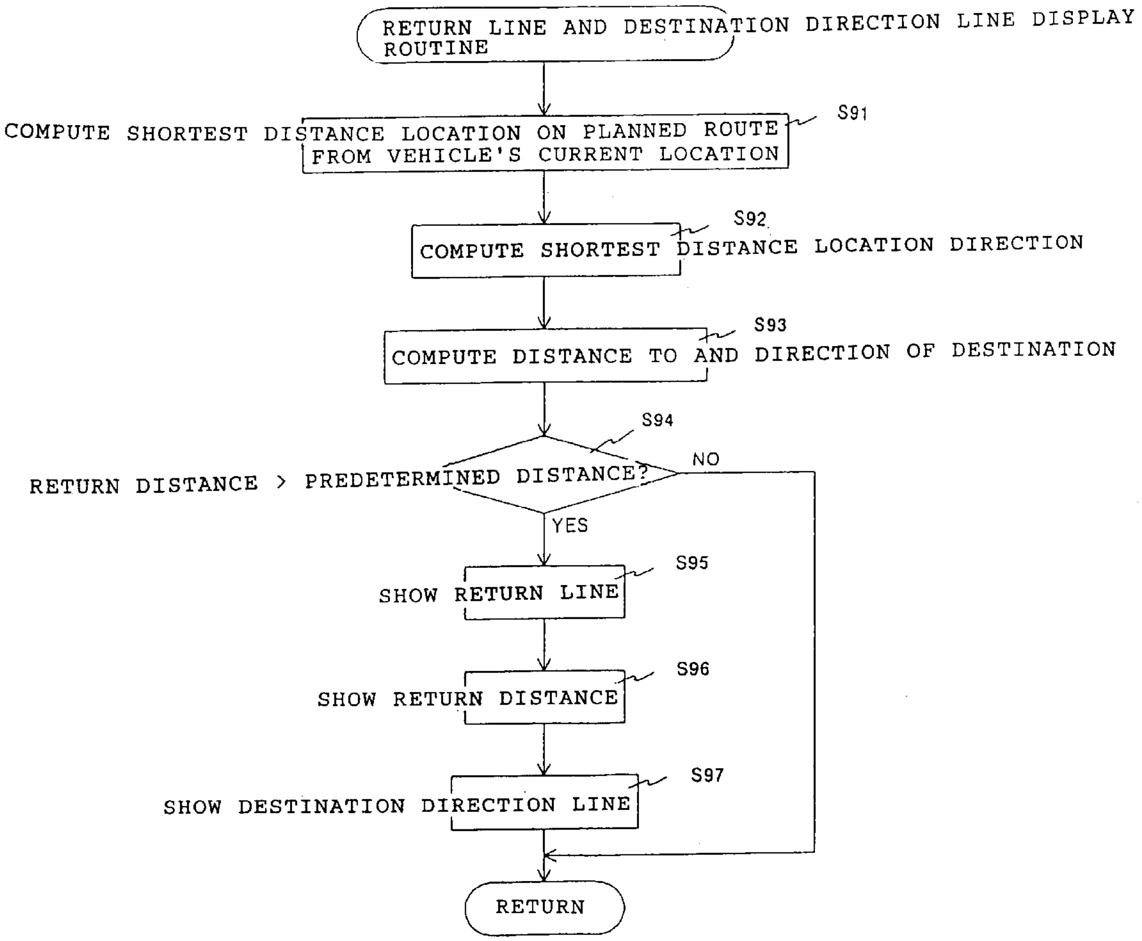
FIG. 18 is a flowchart of a subroutine for displaying a return line and a destination direction line.

Referring to FIG. 18, there is shown a subroutine for displaying the return line and the destination direction line.

First, like the subroutine shown in FIG. 17, a shortest distance location $P_{MIN}$ is computed (step S91) and then the direction of the shortest distance location $P_{MIN}$ is computed (step S92). Next, the distance to and the direction of the destination from the vehicle's current location are computed (step S93) and it is determined whether the return distance is greater than or equal to a predetermined distance (step S94). It should be noted that this predetermined distance may be a default value or variable in accordance with the reduction scale used.

If the return distance is found less than the predetermined distance in step S94, this subroutine immediately comes to an end. If the return distance is found greater than or equal to the predetermined distance, the return line is shown on the display device 51 (step S95) and the return distance is shown at a predetermined location on the display device 51 (step S96). Next, a destination direction line is shown on the display device 51 from the direction to the destination computed in step S93 (step S97), upon which this subroutine comes to an end. It should be noted that, in the example shown in FIG. 16, the line indicated by a phantom line from the vehicle's current location to the destination represents the destination direction line.

Figure 19:
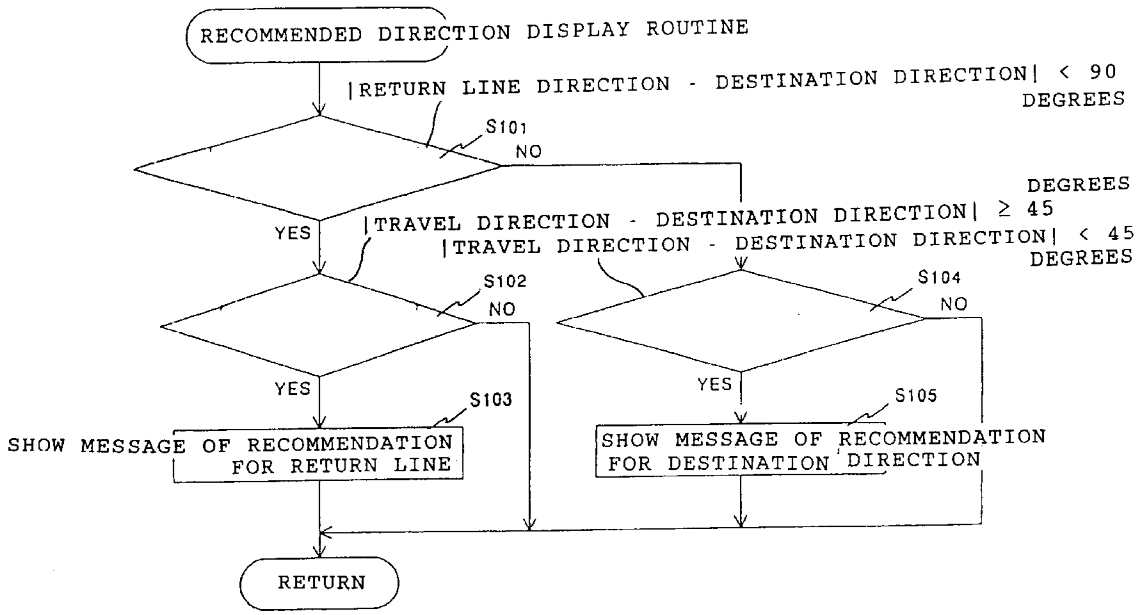
FIG. 19 is a flowchart of a subroutine for determining a recommended travel direction.

Referring to FIG. 19, there is shown a subroutine for determining a recommended travel direction.

First, an angle is computed between the return line and the destination direction line from the return line direction and the destination direction line obtained by executing the subroutine shown in FIG. 17 or 18 and it is determined if the obtained angle is less than 90 degrees or not (step S101). If the angle is found less than 90 degrees, an angle is computed between a travel direction line extending in parallel to the vehicle's travel direction and the destination direction line from the vehicle's travel direction and the destination direction and it is determined whether the obtained angle is greater than or equal to 45 degrees or not (step S102). If the angle is found greater than or equal to 45 degrees, a message is shown on the display device 51 indicating that the vehicle should travel along the return line (step S103), upon which this subroutine comes to an end. If the angle is found less than 45 degrees in step S 102, this subroutine immediately comes to an end.

If the angle between the return line and the destination direction line is found greater than or equal to 90 degrees in step S101, it is determined whether an angle between the travel direction line and the destination direction line is less than 45 degrees or not (step S104). If the angle between the travel direction line and the destination direction line is found less than 45 degrees, a message is shown on the display device 51 indicating that the vehicle should travel along the destination direction (step S105), upon which this subroutine comes to an end. If the angle between the travel direction line and the destination direction line is found greater than or equal to 45 degrees in step S104, this subroutine immediately comes to an end.

In the subroutine shown in FIG. 19, the recommended travel direction is determined from the return line direction, the destination direction, and the vehicle's travel direction. It will be apparent to those skilled in the art that the distance from the vehicle's current location to the destination and the return distance may be added to the conditions for this determination of the recommended travel direction.

Figure 20A:
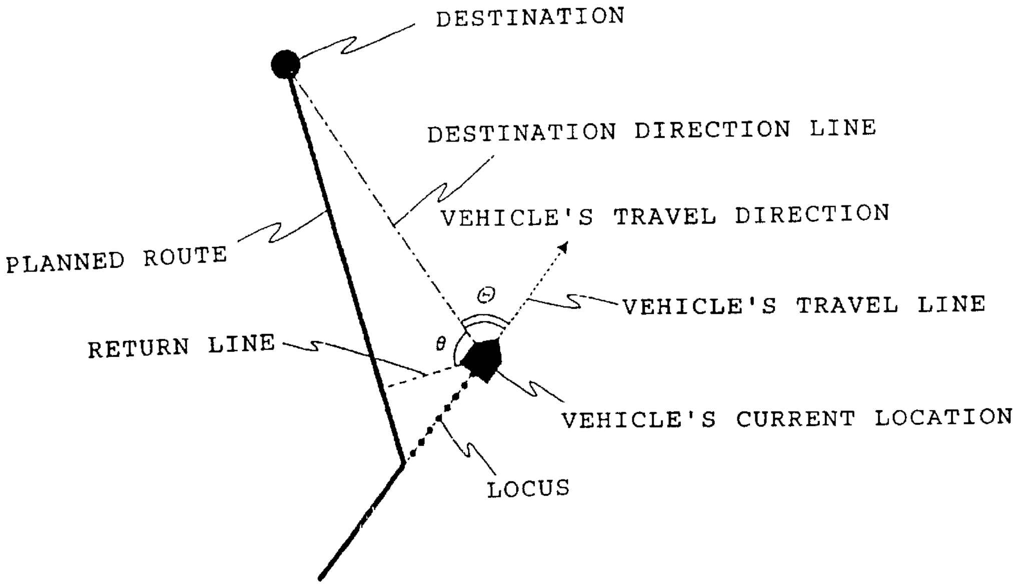
FIG. 20 is a diagram illustrating examples of navigating the vehicle along the return line and navigating the vehicle along the destination direction line.
Figure 20B:
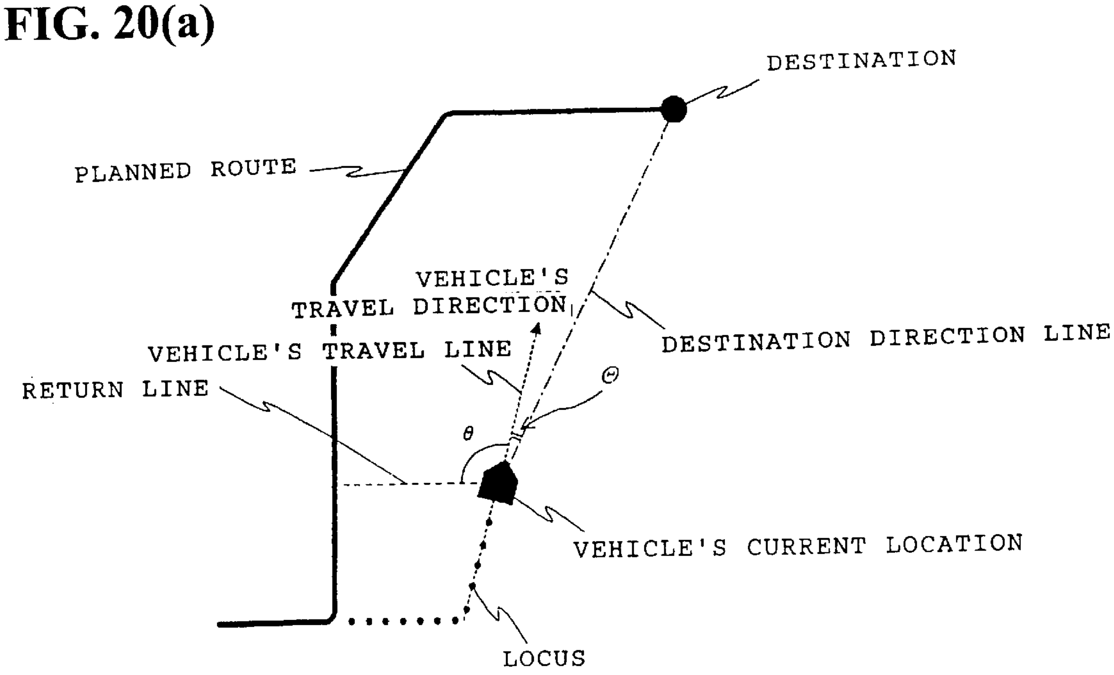

FIG. 20 shows examples in which it is better to navigate the vehicle in the direction of the return line and in the direction of the destination. In these examples, the planned route is represented by thick solid lines, the destination by a large black circle, the vehicle's current location by a black pentagonal marker, and the locus traveled by the vehicle by black dots. The return line is represented by a dashed line, the destination direction line by a phantom line, and the vehicle's travel direction by a dashed arrow.

As shown in FIG. 20(*a*), when the vehicle is traveling in the direction away from the destination, angle θ between the return line and the destination direction line is less than 90 degrees. Angle Θ between the vehicle's travel direction line and the destination direction line is greater than or equal to 45 degrees. In this case, navigating the vehicle along the return line makes it easier for the vehicle to return to the planned route.

As shown in FIG. 20(*b*), when the vehicle is traveling toward the destination, angle θ between the return line and the destination direction line is greater than or equal to 90 degrees. Angle Θ between the vehicle's travel direction line and the destination direction line is less than 45 degrees. In this case, navigating the vehicle along the destination direction line makes the vehicle reach the destination without going a long way round.

Figure 21:
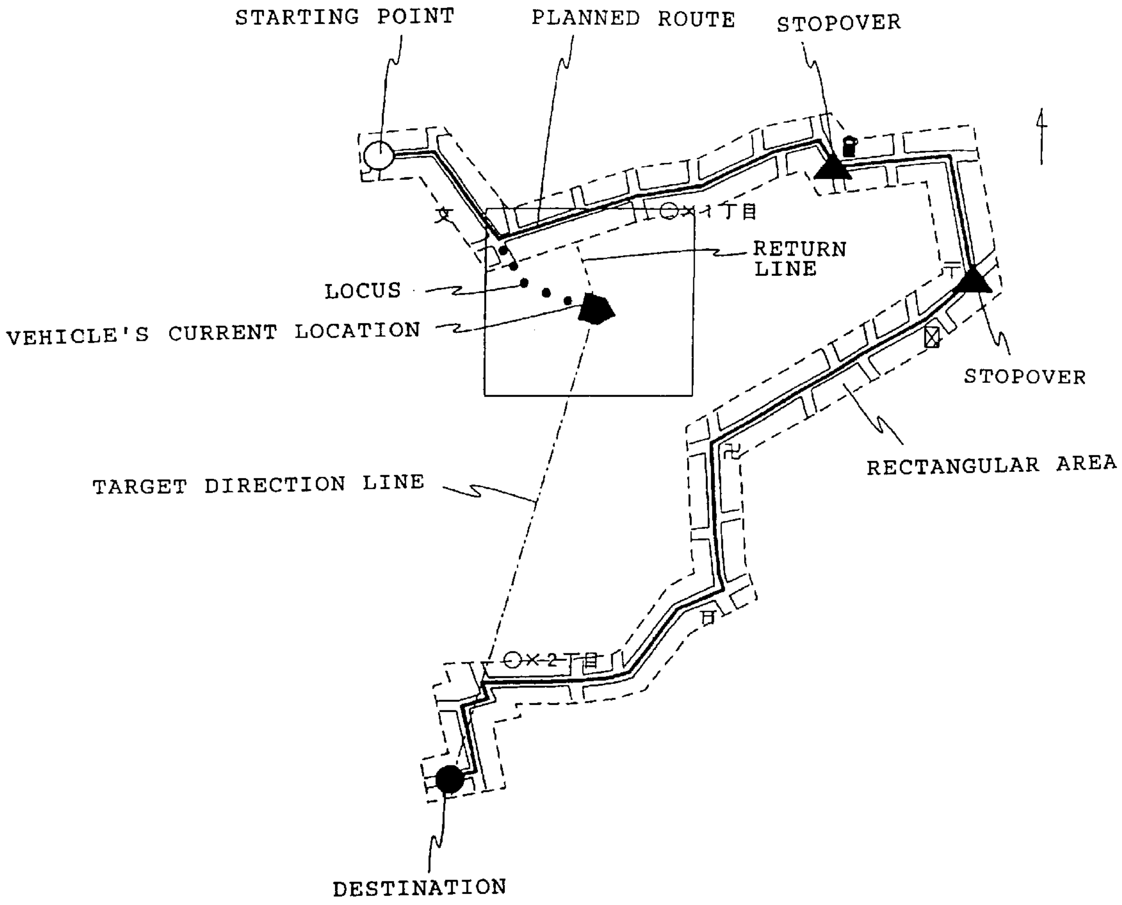
FIG. 21 is a schematic diagram illustrating an example in which the vehicle has moved to a location deviated from the planned travel route.
Figure 22:
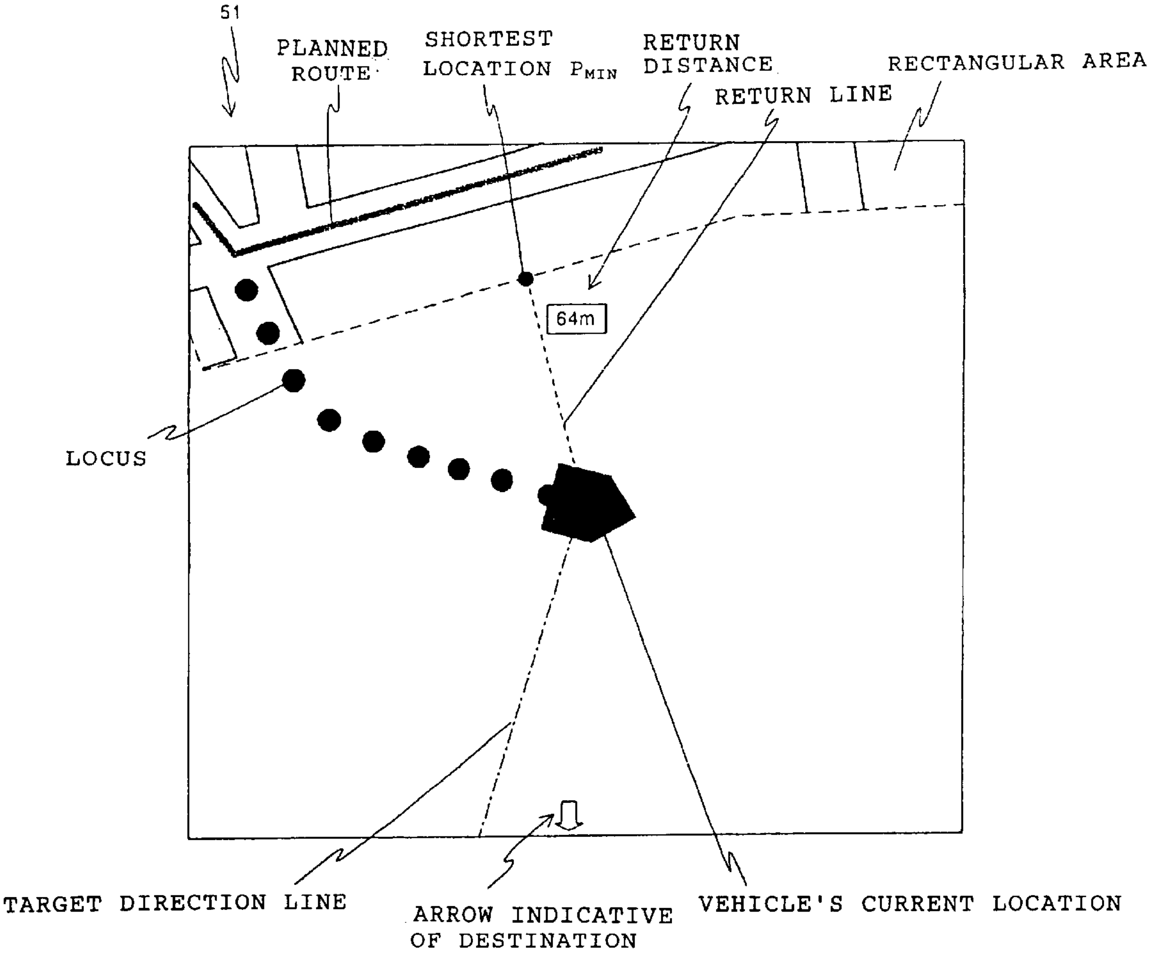
FIG. 22 is a schematic diagram illustrating an enlargement of the area in the square box shown in FIG. 21.

Referring to FIGS. 21 and 22, there are shown examples in which a straight line connecting a shortest distance location in a rectangular area to the current location, the straight line being the shortest from the vehicle's current location to the rectangular area, is shown as a return line. It should be noted that the map information corresponding to the various map information shown in FIGS. 15 and 16 is denoted by the same reference numerals and names. FIG. 21 shows the planned travel route in its entirety as with FIG. 15. The information about the area in a square box shown in FIG. 21 is shown on the display device 51. FIG. 22 shows an enlargement of the area in the square box shown in FIG. 21 as with FIG. 16.

In the above-mentioned configuration, shortest distance location $P_{MIN}$, which makes shortest a distance from the vehicle's current location to the rectangular area, is located in an outer side of the rectangular area as shown in FIG. 22. The return line becomes a straight line extending from the vehicle's current location to shortest distance location $P_{MIN}$. Furthermore, "64m" indicated in the vicinity of the return line indicates a return distance, which is 64 meters from the vehicle's current location to an outer side of the rectangular area.

In the above-mentioned example, executing the subroutines shown in FIGS. 17 through 19 can display the return line, the destination direction line, and the return distance on the display device 51.

Use of the above-mentioned configuration in which the return line and the destination direction line are displayed on the display device 51 as described above allows, if the vehicle has moved to a location for which no rectangular area map information is displayed, the vehicle to return to the rectangular area or reach the destination by heading the vehicle along the return line or the destination direction line.

In the above-mentioned embodiment, the return line and the destination direction line are displayed while the rectangular area map information is displayed on the display device 51. It will be apparent to those skilled in the art that the return line and the destination direction line may be displayed while the road information, the map information, and the planned travel route are all displayed thereby selecting the road along the return line and the destination direction line and moving the vehicle accurately.

Figure 23A:
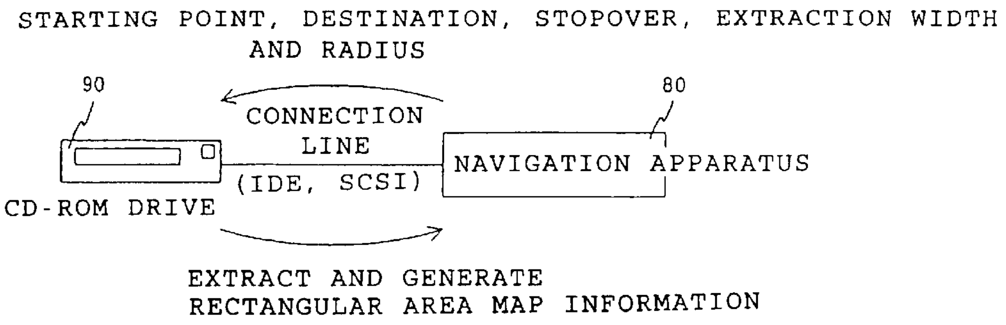
FIG. 23 is schematic diagrams illustrating second and third embodiments of the present invention.
Figure 23B:
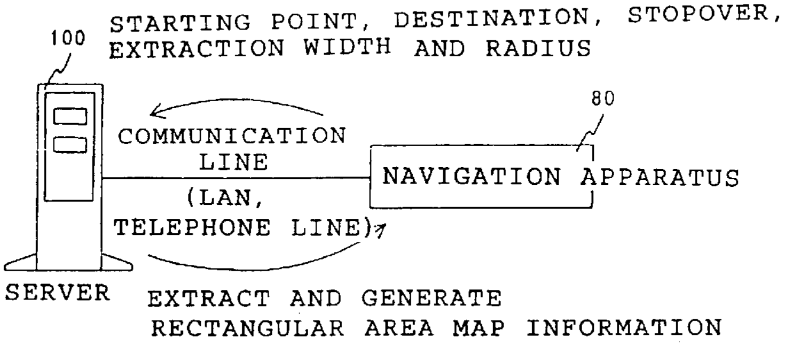
Figure 24A:
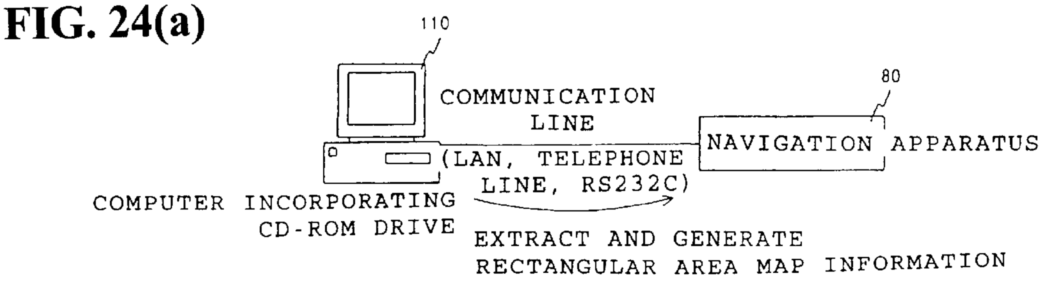
FIG. 24 is a schematic diagram illustrating fourth, fifth, and sixth embodiments of the present invention.
Figure 24B:
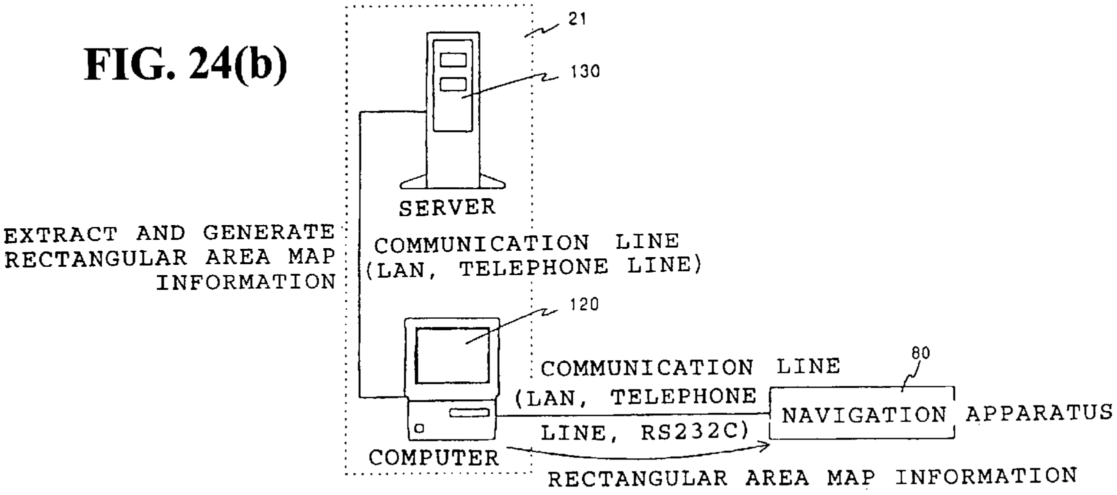
Figure 24C:
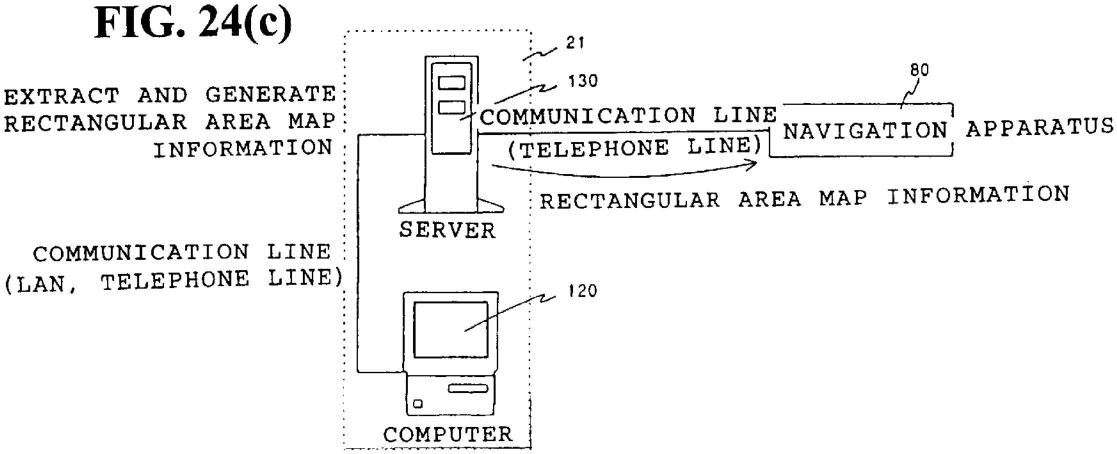

Referring to FIGS. 23 and 24, there are shown second through sixth embodiments of the present invention in which rectangular area map information is generated by executing the subroutine shown in FIG. 12, the generated rectangular area map information is stored in an auxiliary memory or an internal memory, and the stored map information is displayed.

FIG. 23(*a*) depicts a mobile navigation apparatus practiced as the second embodiment of the present invention. In the second embodiment, the mobile navigation apparatus is a navigation apparatus 80 as shown in FIG. 23(*a* ), which comprises the controller 30, the input device 22, and the display device 51 shown in FIG. 1. To display the vehicle's current positional information, the sensors 11 through 15 (not shown) as shown in FIG. 1 are connected to the navigation apparatus 80. In addition, the navigation apparatus 80 has predetermined interface circuits, interface circuits compliant with IDE (Intelligent or Integrated Drive Electronics) and SCSI (Small Computer Interface System) for example, and connectors (not shown) for connection with external storage devices in order to make connections with an external storage device 90 such as a CD-ROM drive or a DVD drive, which is equivalent to the map information supply device 21 shown in FIG. 1.

The processing for storing the map information generated in correspondence with a rectangular area into the auxiliary storage device 38 is executed in a state in which the external storage device 90 is connected to the navigation apparatus 80 and a recording medium such as a CD-ROM storing the map information is loaded on the external storage device 90. When the driver operates the input device 22 of the navigation apparatus 80, the above-mentioned processing starts, executing the subroutine shown in FIG. 12. When this subroutine is executed, the map information corresponding to a predetermined area is read from the recording medium such as a CD-ROM, rectangular area map information is generated in the navigation apparatus 80, and the generated rectangular area map information is stored in the auxiliary storage device 38 of the navigation apparatus 80.

When moving the vehicle with the navigation apparatus 80 on-board, when touring with a motorcycle for example, the external storage device 90 is disconnected from the navigation device 80 and the sensors 11 through 15 such as the GPS are connected to the navigation apparatus 80, thereby displaying the information such as the rectangular area map information and the vehicle's current location while the vehicle is traveling.

FIG. 23(*b*) shows a mobile navigation apparatus practiced as the third embodiment of the present invention. In the third embodiment, the map information supply device 21 shown in FIG. 1 is equivalent to a server 100 storing map information, a server for providing the map information on the Internet for example. As with the second embodiment, the navigation apparatus 80 comprises the controller 30, the input device 22, and the display device 51 shown in FIG. 1. In addition, the navigation apparatus 80 has a communication interface circuit (not shown) for communicating with the server 100 via a communication line, for example, a local area network (hereafter referred to as a LAN) or a telephone line. When displaying the vehicle's current positional information, the sensors 11 through 15 (not shown) shown in FIG. 1 are connected to the navigation apparatus 80.

In the third embodiment, the subroutine shown in FIG. 12 has been executed in advance in another processing apparatus, a personal computer for example (not shown) and the rectangular area map information generated by this execution are stored in the server 100. The processing for storing the generated rectangular area map information into the auxiliary storage device 38 of the navigation apparatus 80 is executed in a state in which the server 100 is connected to the navigation apparatus 80 via the communication line. When the driver operates the input device 22 of the navigation apparatus 80, a predetermined command is issued to the server 100. In accordance with this command, the server 100 is remotely operated to supply the rectangular area map information generated in advance and stored in the server 100 to the navigation apparatus 80. The navigation apparatus 80 stores the supplied rectangular area map information into the auxiliary storage device 38.

When the vehicle travels with the navigation apparatus 80 on-board, the server 100 is disconnected from the navigation apparatus 80 as with the second embodiment, and the sensors 11 through 15 such as the GPS are connected to the navigation apparatus 80 storing the rectangular area map information, thereby displaying the information such as the rectangular area map information and the vehicle's current location on the navigation apparatus 80 while the vehicle is traveling.

FIG. 24(*a* ) depicts a mobile navigation apparatus practiced as the fourth embodiment of the present invention. In the fourth embodiment, the map information supply device 21 shown in FIG. 1 is equivalent to a processing device 110 with a CD-ROM drive or a DVD drive incorporated or connected by, for example, a personal computer. As with the second and third embodiments, the navigation device 80 comprises the controller 30, the input device 22, and the display device 51 shown in FIG. 1. In addition, for connection with the processing device 110, the navigation apparatus 80 has a communication interface circuit (not shown) for communication with a server via a communication line, for example, a LAN or a telephone line. When displaying the vehicle's current positional information, the sensors 11 through 15 (not shown) shown in FIG. 1 are connected to the navigation apparatus 80.

In the fourth embodiment, the processing for generating rectangular area map information is executed with a recording medium storing map information, for example, a CD-ROM, loaded in a drive device such as a CD-ROM drive of the processing device 110. After displaying the map information on a display device connected to the processing device 110, the vehicle driver operates the keyboard or mouse of the processing device 110 to execute the subroutine shown in FIG. 12 in the processing device 110. The rectangular area map information generated by this processing is stored in a storage device such as an internal memory of the processing device 110 or a hard disk. The processing for storing the generated rectangular area map information into the auxiliary storage device 38 is executed with the processing device 110 connected to the navigation apparatus 80 via a communication line. When the driver operates the input device 22 of the navigation apparatus 80, a predetermined command is issued to the processing device 110. In accordance with this command, the processing device 110 is remotely operated to supply the generated rectangular area map information to the navigation apparatus 80. The navigation apparatus 80 stores the supplied rectangular area map information into the auxiliary storage device 38. The processing for storing the rectangular area map information into the auxiliary storage device 38 of the navigation apparatus 80 may alternatively be executed by the driver by operating the keyboard or mouse of the processing device 110 to supply the rectangular area map information to the navigation apparatus 80.

When the vehicle travels with the navigation apparatus 80 on-board, the processing device 110 is disconnected from the navigation apparatus 80 as with the second and third embodiments, and the sensors 11 through 15 such as the GPS are connected to the navigation apparatus 80 storing the rectangular area map information, thereby displaying the information such as the rectangular area map information and the vehicle's current location on the navigation apparatus 80 while the vehicle is traveling.

FIG. 24(*b*) depicts a mobile navigation apparatus practiced as the fifth embodiment of the present invention. In the fifth embodiment, the map information supply device 21 is equivalent to a processing device 120, for example, a computer and a server 130, for example, a server on the Internet. The map information for use in generating rectangular area map information is stored in the server 130. The processing device 120 is connected to the server 130 via a communication line, for example, a LAN or a telephone line. When the driver operates the keyboard or mouse of the processing device 120, the subroutine shown in FIG. 12 is executed in the processing device 120. The processing device 120 reads the map information about a predetermined area from the server 130 and displays the map information on a display device connected to the processing device 120. The desired rectangular area map information generated in the processing device 120 is stored in a storage device such as a memory or a hard disk of the processing device 120. The processing for storing the generated rectangular area map information into the auxiliary storage device 38 of the navigation apparatus 80 is executed with the processing device 120 connected to the navigation apparatus 80 via a communication line. When the driver operates the input device 22 of the navigation apparatus 80, a predetermined command is issued to the processing device 120. In accordance with this command, the processing device 120 is remotely operated to supply the generated rectangular area map information to the navigation apparatus 80. The navigation apparatus 80 stores the supplied rectangular area map information into the auxiliary storage device 38. The processing for storing the rectangular area map information into the auxiliary storage device 38 of the navigation apparatus 80 may alternatively be executed by the driver by operating the keyboard or mouse of the processing device 120 to supply the rectangular area map information.

In the fifth embodiment, as with the second, third, and fourth embodiments, when the vehicle travels with the navigation apparatus 80 on-board, the processing device 120 is disconnected from the navigation apparatus 80 as with the second and third embodiments, and the sensors 11 through 15 such as the GPS are connected to the navigation apparatus 80 storing the rectangular area map information, thereby displaying the information such as the rectangular area map information and the vehicle's current location on the navigation apparatus 80 while the vehicle is traveling.

FIG. 24(*c* ) depicts a mobile navigation apparatus practiced as the sixth embodiment of the present invention. With reference to FIG. 24(*c* ), components similar to those previously described in FIG. 24(*b* ) are denoted by the same reference numbers and names. In the sixth embodiment, as with the fifth embodiment, the map information supply device 21 is equivalent to a processing device 120, for example, a computer and a server 130, for example, a server on the Internet. In the sixth embodiment, as with the fifth embodiment, rectangular area map information is generated in the processing device 120, which supplies the generated rectangular area map information to the server 130, which stores the supplied rectangular area map information. The processing for storing the generated rectangular area map information into the auxiliary storage device 38 of the navigation device 80 is executed with the server 130 connected to the navigation apparatus 80 via a communication line. When the driver operates the input device 22 of the navigation apparatus 80, the rectangular area map information is supplied to the navigation apparatus 80. The navigation apparatus 80 stores the supplied rectangular area map information into the auxiliary storage device 38.

The sixth embodiment allows the vehicle driver to obtain the rectangular area map information from the server 130 at a travel destination or during traveling by connecting the navigation apparatus 80 to the server 130 via a communication line such as a telephone line. In addition, when the vehicle is moving, the sensors 11 through 15 such as the GPS can be connected to the navigation apparatus 80, thereby displaying the rectangular area map information, the vehicle's current location, the return line, and the destination direction line on the navigation apparatus 80.

If the configuration in which the rectangular area map information is read from a server is used in the above-mentioned second through sixth embodiments, all the rectangular area map information need not be stored in the mobile navigation apparatus. Instead, only the rectangular area map information about the areas necessary for current traveling points may be retrieved from the server and displayed on the navigation apparatus. This configuration can further reduce the storage space of the storage device such as the RAM in the mobile navigation apparatus.

In the above-mentioned first through sixth embodiments, the embodied mobile navigation apparatus are used for the map information display apparatus for navigating mobile bodies. It will be apparent to those skilled in the art that these navigation apparatus may also be used by walking persons as long as these apparatus can detect a walkers current location.

It should be noted that "rectangular area" as used herein denotes an area along the length of a planned route. Therefore, the rectangular area may end in a shape other than square; for example a half circle or a half ellipse.

As described above, according to the mobile navigation apparatus of the present invention, if a vehicle deviates from a planned travel route, a straight line connecting a vehicle's current location to a shortest distance location on the planned travel route making a distance shortest from the vehicle's current location to the planned travel route, thereby facilitating the decision as to which direction the vehicle should be headed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mobile navigation apparatus comprising:

current positional information generating means for detecting a current location of a mobile body and generating current positional information;

map information storage means for storing map information including road information;

display map information generating means for reading map information on a predetermined area from said map information storage means on the basis of said current positional information and generating display map information from the map information thus read;

display means for displaying said display map information and said current positional information;

travel route planning means for planning a travel route of said mobile body on the basis of said road information; and wherein, if said current location is deviated from said planned travel route, said display means shows a straight line connecting a shortest distance location on said planned travel route to said current location, said straight line making a distance shortest from said current location to said planned travel route.

2. The mobile navigation apparatus according to claim 1, wherein said display means shows said straight line only when a distance from said current location to said shortest distance location is longer than a predetermined distance.

3. The mobile navigation apparatus according to claim 2, wherein said display map information generating means includes reduction scale setting means for setting a reduction scale of said map information, said display means changing said predetermined distance in accordance with said reduction scale.

4. A mobile navigation apparatus comprising:

current positional information generating means for detecting a current location of a mobile body and generating current positional information;

map information storage means for storing map information including road information;

display map information generating means for reading map information on a predetermined area from said map information storage means on the basis of said current positional information and generating display map information from the map information thus read;

display means for displaying said display map information and said current positional information;

travel route planning means for planning a travel route of a mobile body on the basis of said road information;

rectangular area map information generating means for reading map information corresponding to a rectangular area extending along said planned travel route to generate rectangular area map information; and wherein, if said current location is not included in said rectangular area, said display means shows a straight line connecting a shortest distance location within said rectangular area to said current location, said straight line making a distance shortest from said current location to said rectangular area.

5. The mobile navigation apparatus according to claim 4, wherein said display means shows said straight line only when a distance from said current location to said shortest distance location is longer than a predetermined distance.

6. The mobile navigation apparatus according to claim 5, wherein said display map information generating means includes reduction scale setting means for setting a reduction scale of said map information, said display means changing said predetermined distance in accordance with said reduction scale.

7. A mobile navigation apparatus comprising:

a travel route planning device for planning a travel route of a mobile body on the basis of road information provided by a map information storage device; and wherein, if a current location of said mobile body is deviated from said planned travel route, a straight line connecting a shortest distance location on said planned travel route to said current location is output, said straight line making a distance shortest from said current location to said planned travel route.

8. The mobile navigation apparatus according to claim 7, wherein said straight line is output only when a distance from said current location to said shortest distance location is longer than a predetermined distance.

9. A mobile navigation apparatus comprising:

travel route planning means for planning a travel route of a mobile body on the basis of road information from a map information storage means;

rectangular area map information generating means for reading map information corresponding to a rectangular area extending along said planned travel route to generate rectangular area map information; and wherein, if a current location of said mobile body is not included in said rectangular area, a straight line connecting a shortest distance location within said rectangular area to said current location is output, said straight line making a distance shortest from said current location to said rectangular area.

10. The mobile navigation apparatus according to claim 9, wherein said straight line is output only when a distance from said current location to said shortest distance location is longer than a predetermined distance.

11. A method of navigating a mobile body comprising the steps of:

detecting a current location of a mobile body and generating current positional information;

storing map information including road information;

reading map information on a predetermined area on the basis of said current positional information and generating display map information from the map information thus read;

displaying said display map information and said current positional information;

planning a travel route of said mobile body on the basis of said road information; and if said current location is deviated from said planned travel route, displaying a straight line connecting a shortest distance location on said planned travel route to said current location, said straight line making a distance shortest from said current location to said planned travel route.

12. The method according to claim 11, wherein said step of displaying displays said straight line only when a distance from said current location to said shortest distance location is longer than a predetermined distance.

13. The method according to claim 12, wherein said step of reading further comprises the step of setting a reduction scale of said map information, and said step of displaying further comprises the step of changing said predetermined distance in accordance with said reduction scale.

14. A method of navigating a mobile body comprising the steps of:

detecting a current location of a mobile body and generating current positional information;

storing map information including road information;

reading map information on a predetermined area on the basis of said current positional information and generating display map information from the map information thus read;

displaying said display map information and said current positional information;

planning a travel route of a mobile body on the basis of said road information;

reading map information corresponding to a rectangular area extending along said planned travel route to generate rectangular area map information; and if said current location is not included in said rectangular area, displaying a straight line connecting a shortest distance location within said rectangular area to said current location, said straight line making a distance shortest from said current location to said rectangular area.

15. The method according to claim 14, wherein said step of displaying displays said straight line only when a distance from said current location to said shortest distance location is longer than a predetermined distance.

16. The method according to claim 15, wherein said step of reading further comprises the step of setting a reduction scale of said map information, and said step of displaying further comprises the step of changing said predetermined distance in accordance with said reduction scale.

17. A method of navigating a mobile body comprising the steps of:

planning a travel route of a mobile body on the basis of road information provided by a map information storage device; and if a current location of said mobile body is deviated from said planned travel route, outputting a straight line connecting a shortest distance location on said planned travel route to said current location, said straight line making a distance shortest from said current location to said planned travel route.

18. The method according to claim 17, wherein said step of outputting further comprises the step of outputting said straight line only when a distance from said current location to said shortest distance location is longer than a predetermined distance.

19. A method of navigating a mobile body comprising the steps of:

planning a travel route of a mobile body on the basis of road information from a map information storage means;

reading map information corresponding to a rectangular area extending along said planned travel route to generate rectangular area map information; and if a current location of said mobile body is not included in said rectangular area, outputting a straight line connecting a shortest distance location within said rectangular area to said current location, said straight line making a distance shortest from said current location to said rectangular area.

20. The method according to claim 19, wherein said step of outputting further comprises the step of outputting said straight line only when a distance from said current location to said shortest distance location is longer than a predetermined distance.

* * * * *